US011218036B2

(12) United States Patent
Isogai et al.

(10) Patent No.: US 11,218,036 B2
(45) Date of Patent: Jan. 4, 2022

(54) ROTATING ELECTRIC MACHINE

(71) Applicant: DENSO CORPORATION, Kariya (JP)

(72) Inventors: Koji Isogai, Kariya (JP); Katsuya Fujisaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 714 days.

(21) Appl. No.: 16/047,479

(22) Filed: Jul. 27, 2018

(65) Prior Publication Data

US 2019/0036389 A1    Jan. 31, 2019

(30) Foreign Application Priority Data

Jul. 27, 2017 (JP) .............................. JP2017-145247

(51) Int. Cl.

| H02K 1/16 | (2006.01) |
|---|---|
| H02K 3/12 | (2006.01) |
| H02K 3/48 | (2006.01) |
| H02K 29/03 | (2006.01) |
| H02K 1/27 | (2006.01) |
| H02K 21/14 | (2006.01) |
| H02K 11/33 | (2016.01) |

(Continued)

(52) U.S. Cl.
CPC ............... *H02K 1/16* (2013.01); *H02K 1/165* (2013.01); *H02K 1/2706* (2013.01); *H02K 3/12* (2013.01); *H02K 3/28* (2013.01); *H02K 3/48* (2013.01); *H02K 5/225* (2013.01); *H02K 11/33* (2016.01); *H02K 21/14* (2013.01); *H02K 1/276* (2013.01); *H02K 29/03* (2013.01)

(58) Field of Classification Search
CPC .......... H02K 3/12; H02K 1/16; H02K 1/2706; H02K 2201/06; H02K 29/03

USPC ........ 310/156.01, 216.091, 216.096, 216.097
See application file for complete search history.

(56) References Cited

U.S. PATENT DOCUMENTS

| 2,666,886 A * | 1/1954 | Harding ................. H02K 23/14 |
|---|---|---|
| | | 322/28 |
| 3,619,302 A * | 11/1971 | Aoki ....................... C22C 38/08 |
| | | 148/621 |

(Continued)

FOREIGN PATENT DOCUMENTS

| JP | H09-092561 A | 4/1997 |
|---|---|---|
| JP | H09-228005 A | 9/1997 |

(Continued)

*Primary Examiner* — Tulsidas C Patel
*Assistant Examiner* — Robert E Mates
(74) *Attorney, Agent, or Firm* — Maschoff Brennan

(57) ABSTRACT

A rotating electric machine includes a stator core, multi-phase stator coils and a rotor. The stator core has teeth and slots. Each of the multi-phase stator coils is comprised of phase windings received in the slots of the stator core. The rotor radially faces the teeth of the stator core. Between the multi-phase stator coils, there is provided, at a maximum, a phase difference of $\theta 1$ in electrical angle. Each of the teeth of the stator core has a radially-extending portion and a distal end portion. The distal end portion has skew-forming portions arranged in an axial direction of the stator core. Each of the skew-forming portions has a distal end surface facing the rotor. Circumferential center positions of the distal end surfaces of the skew-forming portions are circumferentially offset from one another by, at a maximum, $\theta 2$ in electrical angle. Moreover, the relationship of $\theta 2 < \theta 1$ is satisfied.

12 Claims, 17 Drawing Sheets

(51) Int. Cl.
*H02K 3/28* (2006.01)
*H02K 5/22* (2006.01)

(56) References Cited

U.S. PATENT DOCUMENTS

| | | | | |
|---|---|---|---|---|
| 5,044,897 | A | * 9/1991 | Dorman | H02K 29/08 417/423.7 |
| 2004/0130236 | A1 | 7/2004 | Yonekura | |
| 2010/0289372 | A1 | 11/2010 | Taniguchi et al. | |
| 2011/0043069 | A1 | 2/2011 | Tanaka et al. | |
| 2012/0019096 | A1* | 1/2012 | Taniguchi | H02K 1/165 310/216.069 |
| 2012/0248924 | A1 | 10/2012 | Tanaka et al. | |
| 2015/0303750 | A1* | 10/2015 | Bouarroudj | H02K 1/2773 417/410.5 |
| 2015/0357892 | A1* | 12/2015 | Nakano | H02K 1/278 180/443 |
| 2018/0115202 | A1 | 4/2018 | Hirotani et al. | |
| 2018/0198330 | A1 | 7/2018 | Takizawa et al. | |

FOREIGN PATENT DOCUMENTS

| | | |
|---|---|---|
| JP | 2003-284276 A | 10/2003 |
| JP | 2010-268597 A | 11/2010 |
| JP | 2011-045193 A | 3/2011 |
| JP | 2012-029351 A | 2/2012 |
| JP | 2012-050223 A | 3/2012 |
| JP | 2012-157236 A | 8/2012 |

\* cited by examiner

ROTATING ELECTRIC MACHINE

CROSS-REFERENCE TO RELATED APPLICATION

This application is based on and claims priority from Japanese Patent Application No. 2017-145247 filed on Jul. 27, 2017, the contents of which are hereby incorporated by reference in its entirety into this application.

BACKGROUND

1 Technical Field

The present invention relates to rotating electric machines.

2 Description of Related Art

There are known rotating electric machines that include a multi-phase stator coil in which multi-phase alternating current flows. More specifically, the multi-phase stator coil is comprised of a plurality of phase windings in which phase currents of the multi-phase alternating current respectively flow. However, the phase currents generally have harmonic components superimposed thereon, causing torque ripple to occur. For example, in three-phase AC rotating electric machines, the third-order harmonic superimposition on the three-phase alternating current causes torque ripple, whose fundamental component is the sixth-order harmonic component, to occur.

To solve the above problem, Japanese Patent Application Publication No. JP2010268597A discloses a rotating electric machine that has an improved stator coil arrangement. Specifically, the rotating electric machine includes first and second three-phase stator coils that are offset in the circumferential direction of a stator core to have a phase difference of π/6 therebetween. Consequently, the torque ripple caused by the sixth-order harmonic components of phase currents supplied to phase windings of the first stator coil can be offset (or canceled) by the torque ripple caused by the sixth-order harmonic components of phase currents supplied to phase windings of the second stator coil. As a result, the total torque ripple generated in the rotating electric machine can be reduced.

However, main causes of torque ripple also include the double-order harmonic component (i.e., the harmonic component whose order is twice the order of the fundamental component) and the triple-order harmonic component (i.e., the harmonic component whose order is three times the order of the fundamental component) in addition to the fundamental component (i.e., the sixth-order harmonic component).

With the stator coil arrangement disclosed in the above patent document, it is possible to reduce only the fundamental component and the triple-order harmonic component. Therefore, it is desired to further reduce the double-order harmonic component in addition to the fundamental component and the triple-order harmonic component.

SUMMARY

According to exemplary embodiments, there is provided a rotating electric machine which includes a stator core, a plurality of multi-phase stator coils and a rotor. The stator core has an annular back yoke, a plurality of teeth and a plurality of slots. The teeth each radially protrude from the back yoke and are circumferentially spaced from one another. Each of the slots is formed between one circumferentially-adjacent pair of the teeth. Each of the multi-phase stator coils is comprised of a plurality of phase windings received in the slots of the stator core. The rotor is provided to rotate relative to the stator core. The rotor radially faces the teeth of the stator core. Between the plurality of multi-phase stator coils, there is provided, at a maximum, a phase difference of $\theta 1$ in electrical angle. Each of the teeth of the stator core has a radially-extending portion that radially extends from the back yoke and a distal end portion formed on the rotor side of the radially-extending portion. The distal end portion has a plurality of skew-forming portions arranged in an axial direction of the stator core. Each of the skew-forming portions has a distal end surface facing the rotor. Circumferential center positions of the distal end surfaces of the skew-forming portions are circumferentially offset from one another by, at a maximum, $\theta 2$ in electrical angle. Moreover, the relationship of $\theta 2 < \theta 1$ is satisfied.

Consequently, with the phase difference provided between the multi-phase stator coils, the fundamental and triple-order harmonic components of pulsating magnetic force generated by one of the multi-phase stator coils can be offset (or canceled) by those of pulsating magnetic force generated by another of the multi-phase stator coils, thereby reducing torque ripple generated in the rotating electric machine.

Moreover, with the circumferential center positions of the distal end surfaces of the skew-forming portions circumferentially offset from each other and satisfying the relationship of $\theta 2 < \theta 1$, the double-order harmonic component of the pulsating magnetic force generated by one of the multi-phase stator coils can be offset by that of the pulsating magnetic force generated by another of the multi-phase stator coils, thereby further reducing the torque ripple generated in the rotating electric machine.

As a result, it becomes possible to achieve a further reduction in the torque ripple in comparison with the case of reducing the torque ripple only by providing a phase difference between the multi-phase stator coils.

BRIEF DESCRIPTION OF THE DRAWINGS

The present invention will be understood more fully from the detailed description given hereinafter and from the accompanying drawings of exemplary embodiments, which, however, should not be taken to limit the present invention to the specific embodiments but are for the purpose of explanation and understanding only.

In the accompanying drawings.

DESCRIPTION OF EMBODIMENTS

Figure 1:
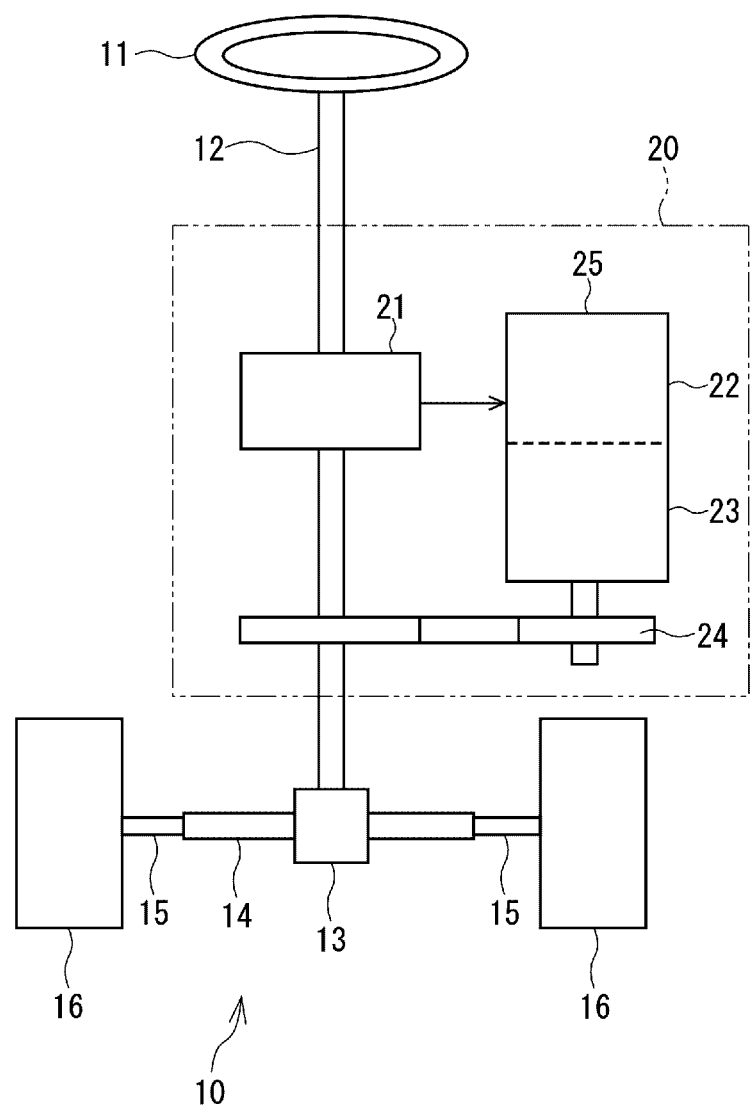
FIG. 1 is a schematic view illustrating the configuration of an electric power steering apparatus in which an electric motor according to a first embodiment is employed.

Exemplary embodiments will be described hereinafter with reference to FIGS. 1-19. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

A rotating electric machine according to the first embodiment is configured as an electric motor 23 that is employed in an electric power steering apparatus 20 of a vehicle.
(Configuration of Electric Power Steering Apparatus)

First, the configuration of the electric power steering apparatus 20 will be described with reference to FIG. 1.

As shown in FIG. 1, the electric power steering apparatus 20 is included in a steering system 10 of the vehicle.

In the steering system 10, the rotational motion of a steering wheel 11, which is created by a driver of the vehicle, is transmitted to a rack-and-pinion mechanism 13 via a steering shaft 12 and converted by the rack-and-pinion mechanism 13 into a linear motion of a rack shaft 14. The linear motion of the rack shaft 14 is then transmitted to a pair of wheels 16 of the vehicle via tie roads 15, thereby steering (or changing the orientation of) the pair of wheels 16. The electric power steering apparatus 20 outputs steering-assist torque (or torque for assisting the driver in steering the pair of wheels 16) to the steering shaft 12.

The electric power steering apparatus 20 includes a torque sensor 21, and ECU (Electronic Control Unit) 22, the electric motor 23 and a transmission mechanism 24. The torque sensor 21 is mounted on the steering shaft 12 to detect (or sense) steering torque applied by the driver to the steering wheel 11. The ECU 22 sets target steering-assist torque on the basis of detected values of parameters from various sensors including the torque sensor 21; then, it controls the electric motor 23 to generate the set target steering-assist torque. The electric motor 23 and the ECU 22 are integrated to together form the drive apparatus 25. The transmission mechanism 24 is configured to transmit the steering-assist torque outputted from the electric motor 23 to the steering shaft 12.

In addition, in the present embodiment, the electric power steering apparatus 20 is configured as a column assist electric power steering apparatus. However, it should be appreciated that the electric power steering apparatus 20 may alternatively be configured as a rack assist electric power steering apparatus.
(Configuration of Drive Apparatus)

Figure 2:
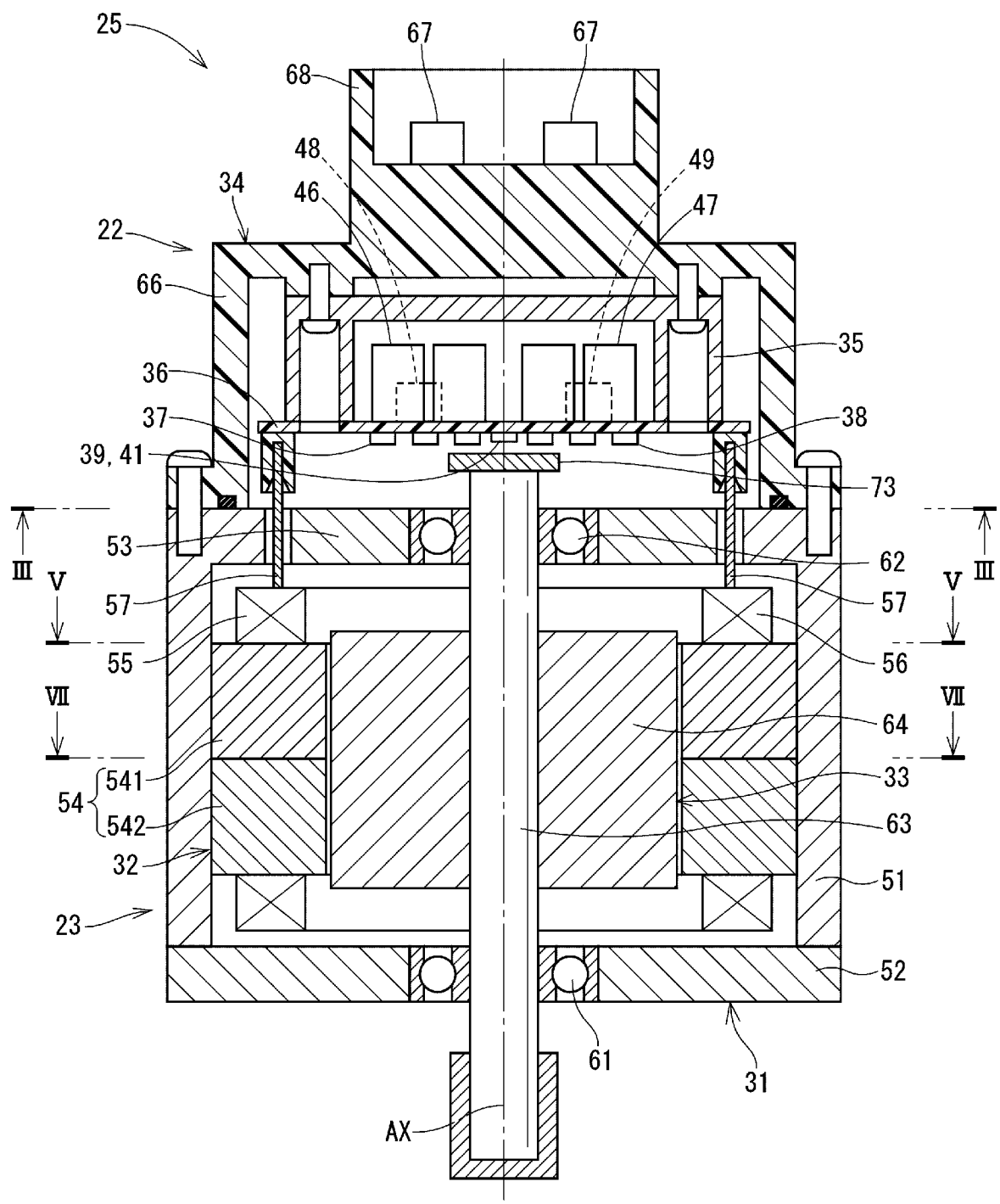
FIG. 2 is a cross-sectional view of a drive apparatus of the electric power steering apparatus, the drive apparatus including the electric motor according to the first embodiment.
Figure 3:
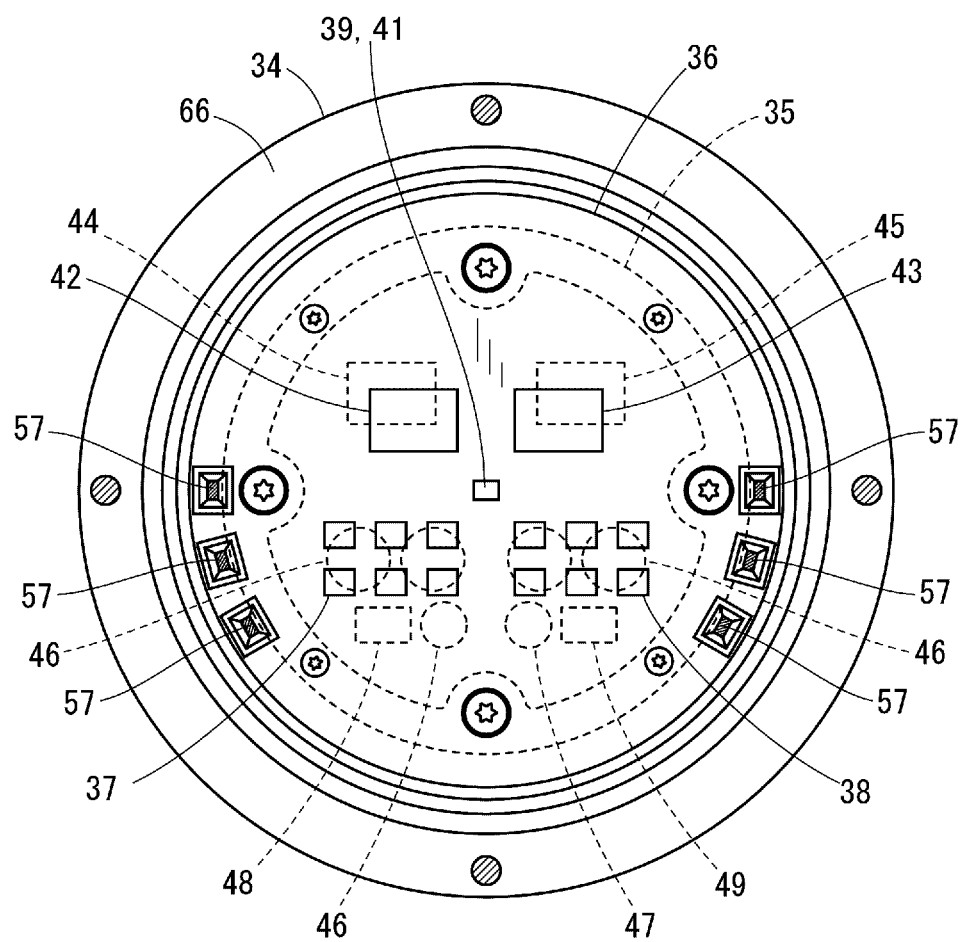
FIG. 3 is a cross-sectional view taken along the line III-III in FIG. 2.

As shown in FIGS. 2 and 3, the drive apparatus 25 includes a housing 31, a stator 32 and a rotor 33, which together constitute the electric motor 23. The drive apparatus 25 also includes a cover 34, a heat sink 35, a substrate 36 and various electronic components 37-49, which together constitute the ECU 22.

The housing 31 includes a tubular case 51, a front end wall 52 located at a front end (i.e., lower end in FIG. 2) of the tubular case 51 and a rear end wall 53 located at a rear end (i.e., upper end in FIG. 2) of the tubular case 51.

The stator 32 includes a stator core 54 and first and second three-phase stator coils 55 and 56. The stator core 54 is fixed to the housing 31. The first and second three-phase stator coils 55 and 56 are assembled to the stator core 54. Each of the first and second three-phase stator coils 55 and 56 is comprised of a plurality of phase windings; each of the phase windings is connected to the substrate 36 via a lead wire 57.

The rotor 33 includes a motor shaft 63, a rotor core 64 and a plurality of permanent magnets 65. The motor shaft 63 is rotatably supported by the housing 31 via a pair of bearings 61 and 62. The rotor core 64 is fixedly fitted on the motor shaft 63 so as to rotate together with the motor shaft 63. The permanent magnets 65 are embedded in an outer peripheral portion of the rotor core 64 (see FIG. 5). That is, in the present embodiment, the rotor 33 is configured as an IPM (Interior Permanent Magnet) rotor.

The cover 34 includes a cup-shaped main body 66 and a connector part 68. The main body 66 is fixed to the rear end wall 53 of the housing 31. The connector part 68 includes terminals 67 for externally connecting the ECU 22.

The heat sink 35 is fixed inside the main body 66 of the cover 34.

The substrate 36 is fixed to a front end portion (i.e., lower end portion in FIG. 2) of the heat sink 35 which faces the rear end wall 53 of the housing 31. On the substrate 36, there are mounted a plurality of switching elements 37 and 38, rotation angle sensors 39 and 41, custom ICs 42 and 43, microcomputers 44 and 45, capacitors 46 and 47 and inductors 48 and 49.

The switching elements 37 together form a first drive circuit 71, while the switching elements 38 together form a second drive circuit 72. The first and second drive circuits 71 and 72 (see FIG. 4) are connected respectively to the first and second three-phase stator coils 55 and 56.

The rotation angle sensors 39 and 41 are arranged to face at least one permanent magnet 73 provided on a rear end (i.e., upper end in FIG. 2) of the motor shaft 63.

The custom IC 42 outputs drive signals to the switching elements 37 forming the first drive circuit 71, while the custom IC 43 outputs drive signals to the switching elements 38 forming the second drive circuit 72.

The microcomputer 44 sets, based on the rotation angle of the motor shaft 63 and the like, command values for electric power supplied to the first three-phase stator coil 55. Similarly, the microcomputer 45 sets, based on the rotation angle of the motor shaft 63 and the like, command values for electric power supplied to the second three-phase stator coil 56.

The capacitor 46 smoothes electric power inputted from a DC power source (not shown) to the first drive circuit 71. Moreover, the capacitor 46 also suppresses output of electromagnetic noise generated by switching operation of the switching elements 37. Similarly, the capacitor 47 smoothes electric power inputted from the DC power source to the second drive circuit 72. Moreover, the capacitor 47 also suppresses output of electromagnetic noise generated by switching operation of the switching elements 38.

The inductor 48 forms, together with the capacitor 46, a first filter circuit. Similarly, the inductor 49 forms, together with the capacitor 47, a second filter circuit.

The drive apparatus 25, which is configured as described above, energizes the first and second three-phase stator coils 55 and 56 based on the rotation angle of the motor shaft 63 detected by the rotation angle sensors 39 and 41, thereby creating a rotating magnetic field to rotate the rotor 33.

In addition, in the present embodiment, as described above, the drive apparatus 25 has the ECU 22 and the electric motor 23 formed integrally into a one-piece structure. However, it should be noted that the drive apparatus 25 may alternatively have the ECU 22 and the electric motor 23 formed separately and connected with each other via, for example, a cable harness.

(Configuration of Electric Motor)

Figure 4:
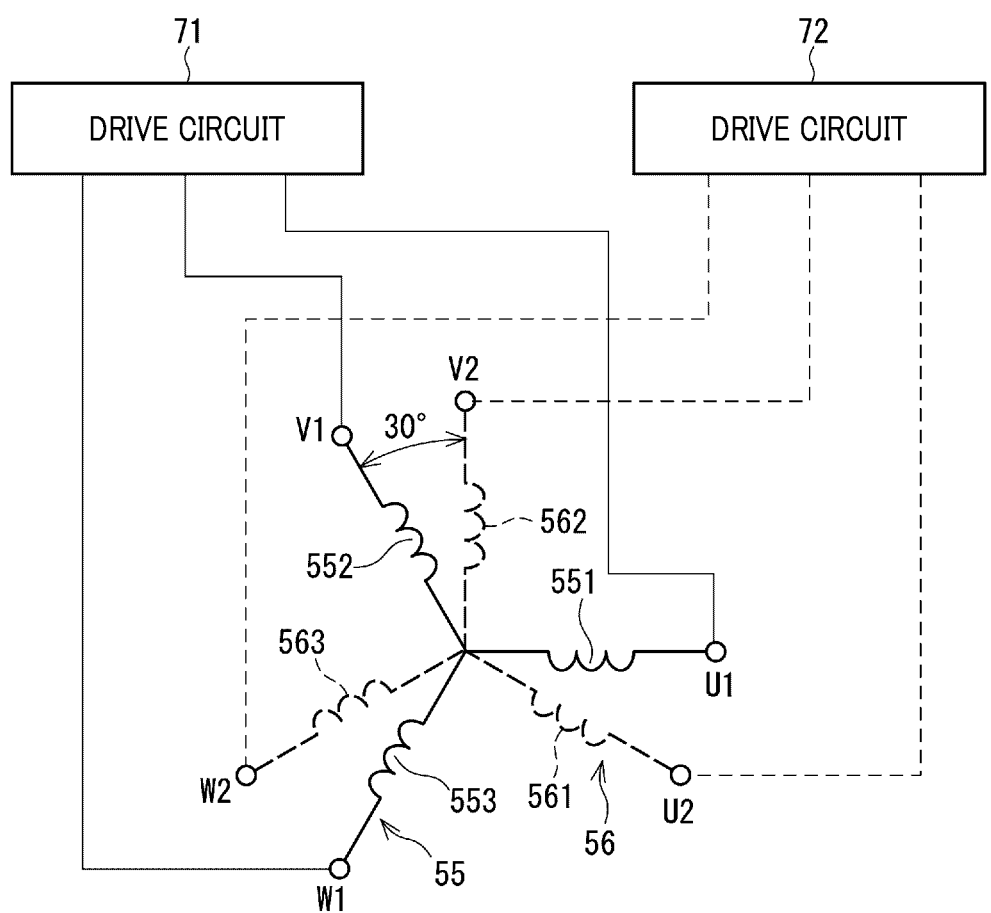
FIG. 4 is a schematic view illustrating the arrangement of first and second three-phase stator coils in the electric motor according to the first embodiment.

Referring to FIG. 4, in the electric motor 23, the first and second three-phase stator coils 55 and 56, which have the same electrical characteristics, are arranged on the common stator core 54 so as to be offset from each other by θ1 (e.g., 30e) in electrical angle. Accordingly, to the first and second three-phase stator coils 55 and 56, there are respectively supplied first and second three-phase alternating currents which are different in phase by θ1 from each other and whose amplitudes are identical to each other.

As shown in FIG. 2, in the present embodiment, the stator core 54 is comprised of first and second stator core segments 541 and 542 that are assembled to each other in an axial direction of the stator core 54 (or the direction of an axis AX of the motor shaft 63).

Figure 5:
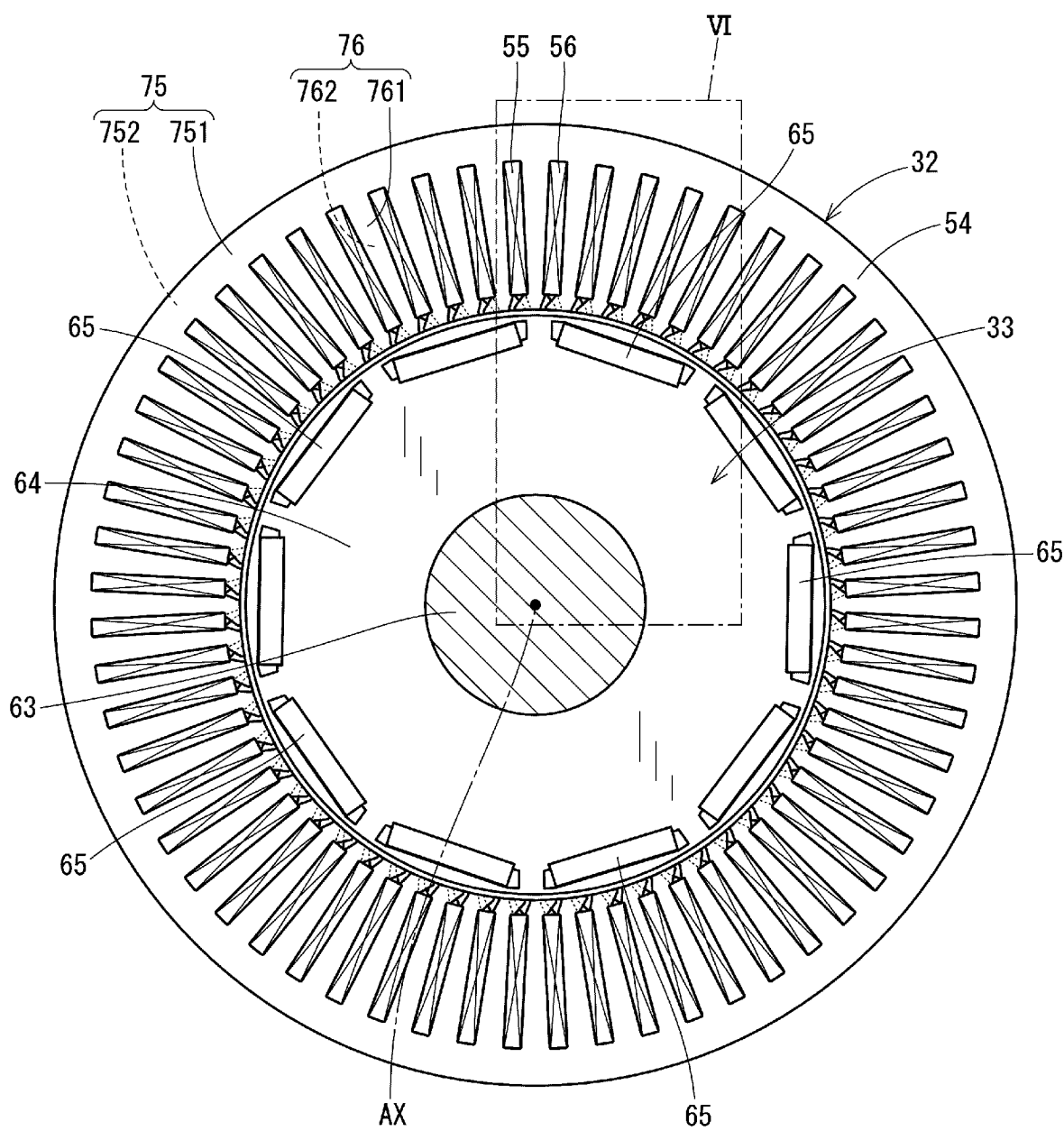
FIG. 5 is a cross-sectional view of the electric motor according to the first embodiment taken along the line V-V in FIG. 2.
Figure 6:
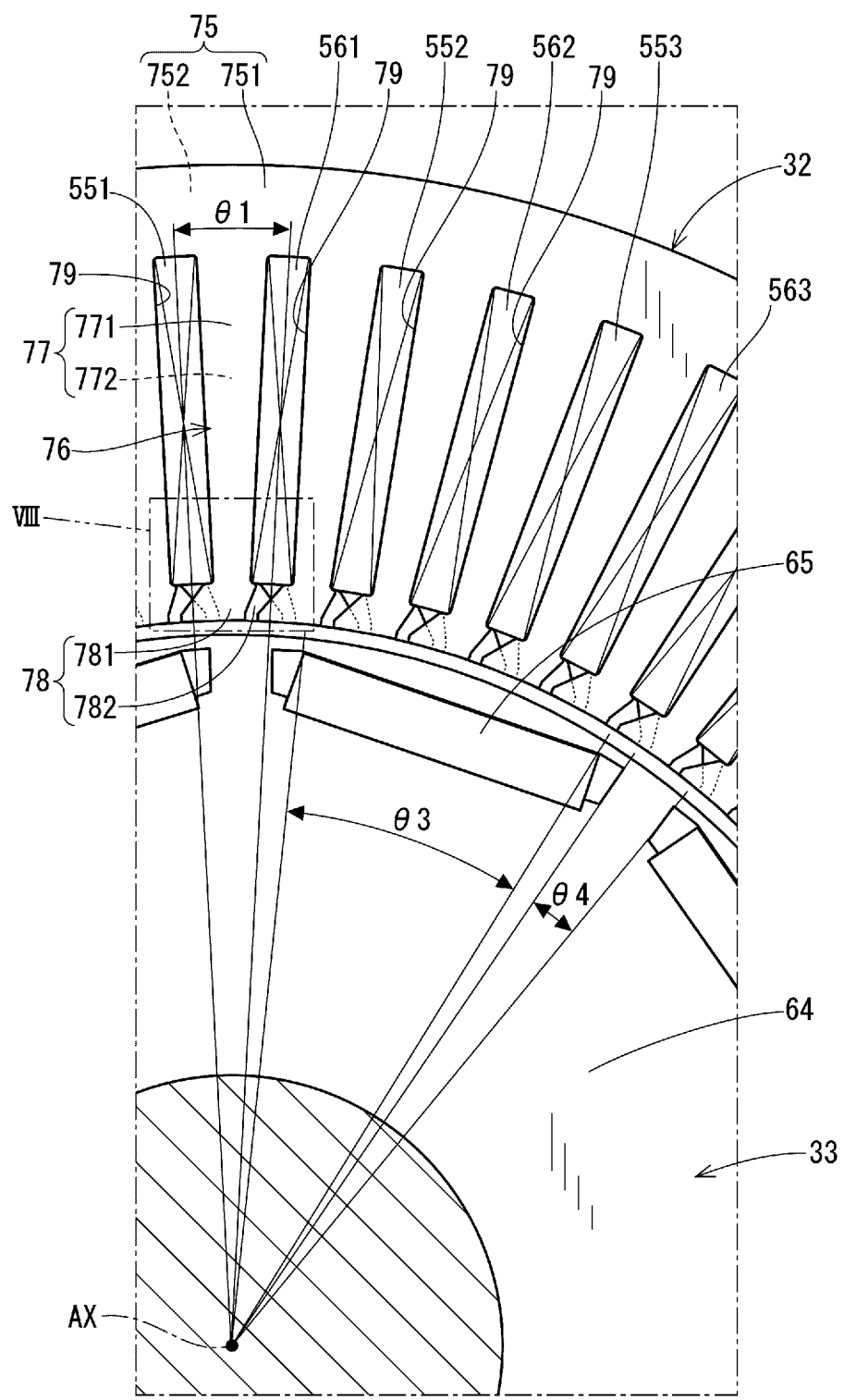
FIG. 6 is an enlarged view of a part VI of FIG. 5.

As shown in FIGS. 5 and 6, the first stator core segment 541 includes an annular back yoke part 751 and a plurality of tooth parts 761. The tooth parts 761 each protrude radially inward from the back yoke part 751 and are circumferentially spaced from one another. Moreover, each of the tooth parts 761 includes a first radially-extending portion 771 that extends radially inward from the back yoke part 751 and a first skew-forming portion 781 formed at a radially inner end of the first radially-extending portion 771 (or formed on the rotor 33 side of the first radially-extending portion 771).

Figure 7:
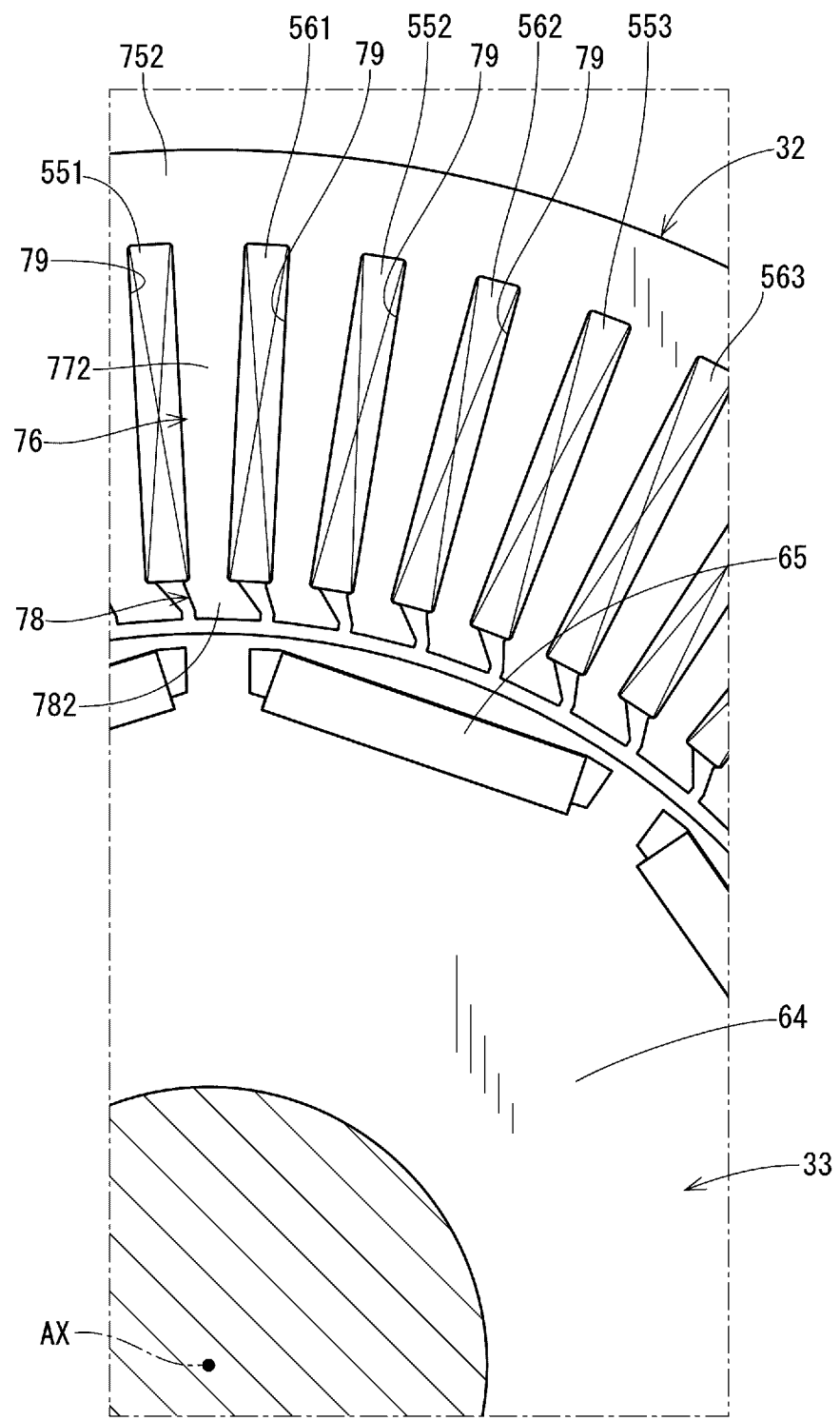
FIG. 7 is an enlarged view of a part of a cross section of the electric motor according to the first embodiment, the cross section being taken along the line VII-VII in FIG. 2.

Similarly, as shown in FIG. 7, the second stator core segment 542 includes an annular back yoke part 752 and a plurality of tooth parts 762. The tooth parts 762 each protrude radially inward from the back yoke part 752 and are circumferentially spaced from one another. Moreover, each of the tooth parts 762 includes a second radially-extending portion 772 that extends radially inward from the back yoke part 752 and a second skew-forming portion 782 formed at a radially inner end of the second radially-extending portion 772 (or formed on the rotor 33 side of the second radially-extending portion 772).

As shown in FIG. 6, the back yoke part 751 of the first stator core segment 541 and the back yoke part 752 of the second stator core segment 542 are axially superposed to together form an annular back yoke 75 of the stator core 54. On the other hand, each corresponding pair of the tooth parts 761 of the first stator core segment 541 and the tooth parts 762 of the second stator core segment 542 are axially superposed to together form one of teeth 76 of the stator core 54. The teeth 76 each protrude radially inward from the back yoke 75 and are circumferentially spaced from one another.

When viewed along the axial direction, the first radially-extending portions 771 of the tooth parts 761 of the first stator core segment 541 have the same shape as the second radially-extending portions 772 of the tooth parts 762 of the second stator core segment 542. Moreover, each of the first radially-extending portions 771 is located at the same circumferential position as a corresponding one of the second radially-extending portions 772. Each corresponding pair of the first radially-extending portions 771 and the second radially-extending portions 772 are axially superposed to together form one of radially-extending portions 77 of the teeth 76 of the stator core 54. Between each circumferentially-adjacent pair of the radially-extending portions 77 of the teeth 76, there is formed one of slots 79 of the stator core 54. In addition, the slots 79 of the stator core 54 each extend straight from one axial end to the other axial end of the stator core 54.

In the slots 79 of the stator core 54, there are received the first and second three-phase stator coils 55 and 56. As shown in FIG. 4, the first three-phase stator coil 55 is comprised of a U-phase winding 551, a V-phase winding 552 and a W-phase winding 553. Similarly, the second three-phase stator coil 56 is comprised of a U-phase winding 561, a V-phase winding 562 and a W-phase winding 563.

The slots 79 of the stator core 54 are formed at equal angular intervals, in other words, at a predetermined pitch of θ1 (e.g., 30°) in electrical angle. The first and second three-phase stator coils 55 and 56 are wound on the stator core 54 so that each of the phase windings 551-553 of the first three-phase stator coil 55 is offset in the circumferential direction of the stator core 54 by θ1 in electrical angle from a corresponding one of the phase windings 561-563 of the second three-phase stator coil 56. Consequently, there is provided a phase difference of θ1 in electrical angle between the first and second three-phase stator coils 55 and 56.

Figure 8:
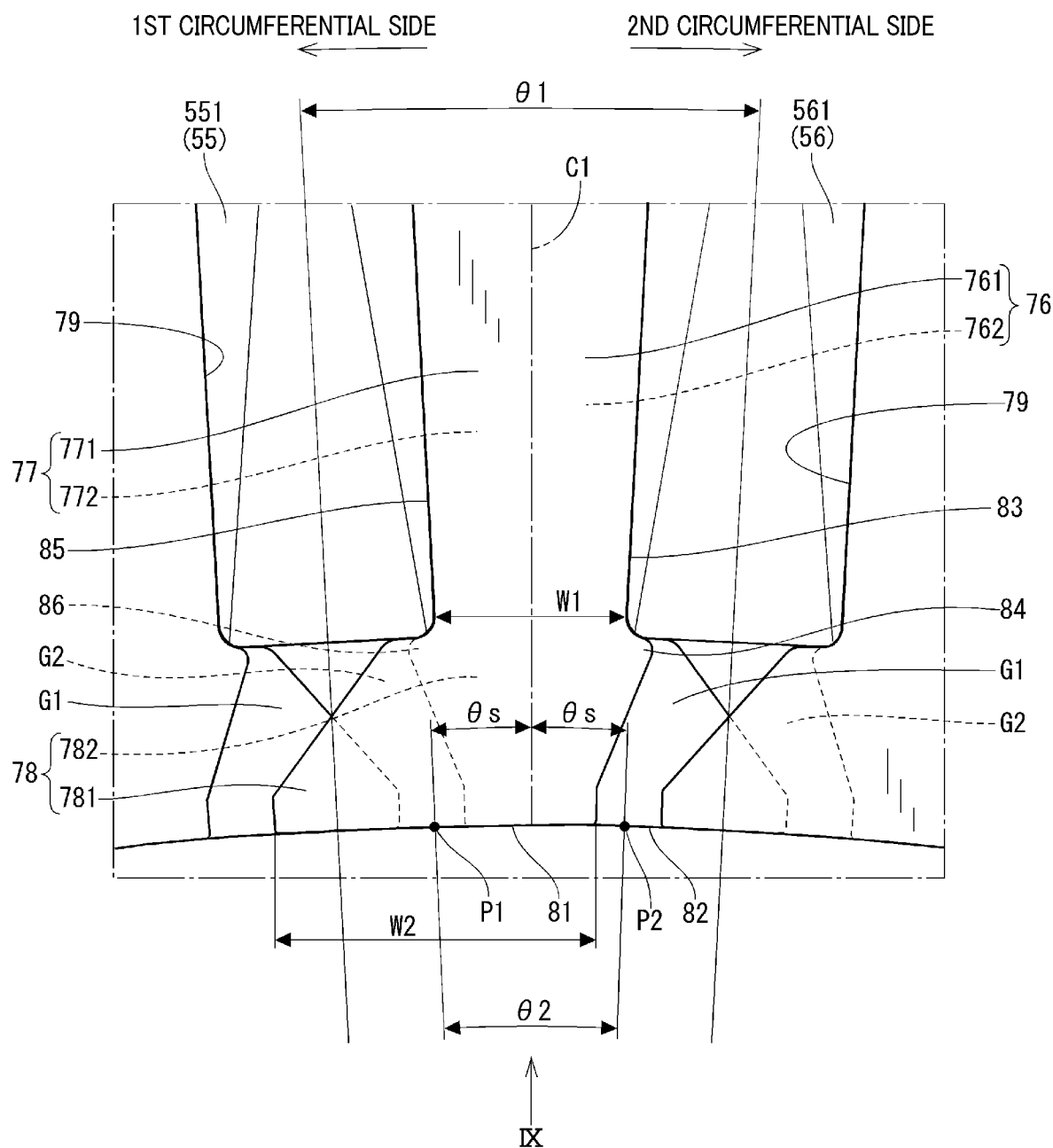
FIG. 8 is an enlarged view of a part VIII of FIG. 6.

As shown in FIG. 8, each corresponding pair of the first skew-forming portions 781 of the tooth parts 761 of the first stator core segment 541 and the second skew-forming portions 782 of the tooth parts 762 of the second stator core segment 542 are axially stacked to together form one of distal end portions 78 of the teeth 76 of the stator core 54.

In each of the teeth 76 of the stator core 54, the first skew-forming portion 781 forming the distal end portion 78 of the tooth 76 protrudes toward a first circumferential side from the radially-extending portion 77 of the tooth 76; the second skew-forming portion 782 forming the distal end portion 78 of the tooth 76 protrudes toward a second circumferential side, which is opposite to the first circumferential side, from the radially-extending portion 77 of the tooth 76.

Moreover, the first skew-forming portion 781 has a distal end surface or radially inner end surface) 81 facing the rotor 33 (see FIG. 6). The circumferential center position (or the position of the circumferential center) P1 of the distal end surface 81 is offset toward the first circumferential side by θs from a first imaginary plane C1 that circumferentially bisects (i.e., bisects in the circumferential direction of the stator core 54) the radially-extending portion 77 of the tooth 76. That is, the skew angle of the circumferential center position P1 of the distal end surface 81 with respect to the first imaginary plane C1 is equal to θs.

On the other hand, the second skew-forming portion 782 has a distal end surface (or radially inner end surface) 82 facing the rotor 33 (see FIG. 6). The circumferential center position (or the position of the circumferential center) P2 of the distal end surface 82 is offset toward the second circumferential side by θs from the first imaginary plane C1. That is, the skew angle of the circumferential center position P2 of the distal end surface 82 with respect to the first imaginary plane C1 is also equal to θs.

Figure 9:
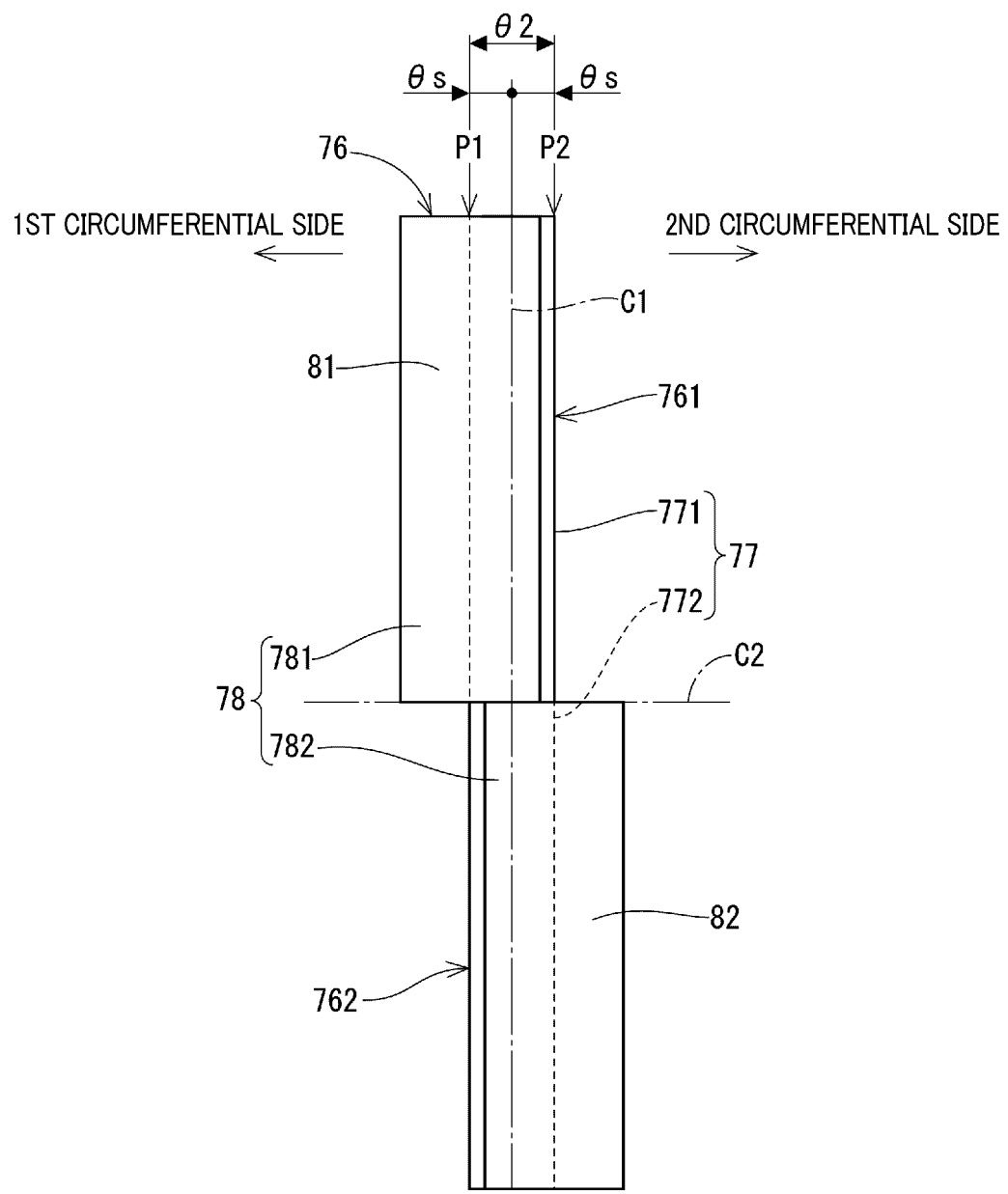
FIG. 9 is a schematic view, along the arrow IX in FIG. 8, of one of stator core teeth of the electric motor according to the first embodiment.

As shown in FIG. 9, the first skew-forming portion 781 and the second skew-forming portion 782 are circumferentially offset and partially axially aligned with each other, forming a two-stage skew.

Moreover, as shown in FIGS. 8 and 9, the circumferential center positions P1 and P2 of the distal end surfaces 81 and 82 of the first and second skew-forming portions 781 and 782 are circumferentially offset from each other by θ2 in electrical angle from each other. Further, the following relationship (1) is satisfied:

$$\theta 2 < \theta 1 \quad (1)$$

More particularly, in the present embodiment, θ1 is set to 30° in electrical angle and θ2 is set to 15° in electrical angle. In addition, θ2 is twice θs (i.e., θ2=2×θs).

Figure 10:
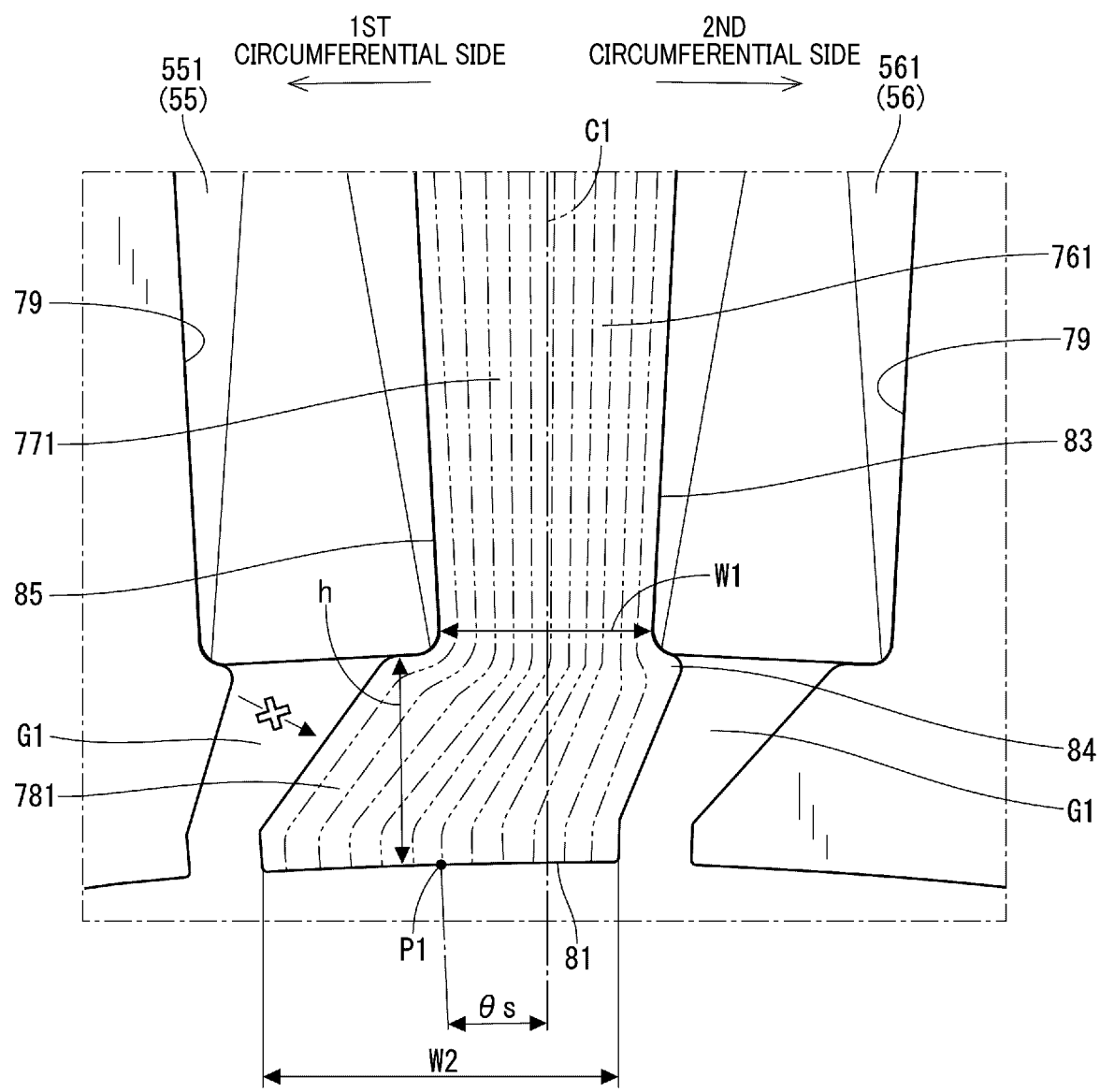
FIG. 10 is a schematic view illustrating the configuration of a first skew-forming portion of the stator core tooth shown in FIG. 9.

Furthermore, in the present embodiment, as shown in FIG. 10, the following relationships (2) and (3) are also satisfied:

$$h \geq 0.6 W1 \quad (2)$$

$$W2 > W1 \quad (3)$$

where h is the radial height of the first skew-forming portion 781, W1 is the minimum circumferential width of the radially-extending portion 77 of the tooth 76 at the radially inner end (or the distal end portion 78-side end) thereof, and W2 is the circumferential width of the distal end surface 81 of the first skew-forming portion 781.

In addition, though not shown in the figures, the second skew-forming portion 782 also satisfies the above relationships (2) and (3).

As shown in FIG. 8, the entire distal end surface 81 of the first skew-forming portion 781 is located on the first circumferential side of one side surface 83 of the radially-extending portion 77 which is on the second circumferential side. Moreover, at a radially outer end (or the radially-extending portion 77-side end) of the first skew-forming portion 781, there is formed a first protrusion 84 that protrudes from the radially-extending portion 77 toward the second circumferential side. The first protrusion 84 functions as a coil holder to hold the first and second three-phase stator coils 55 and 56.

On the other hand, the entire distal end surface 82 of the second skew-forming portion 782 is located on the second circumferential side of another side surface 85 of the radially-extending portion 77 which is on the first circumferential side. Moreover, at a radially outer end (or the radially-extending portion 77-side end) of the second skew-forming portion 782, there is formed a second protrusion 86 that protrudes from the radially-extending portion 77 toward the first circumferential side. The second protrusion 86 also functions as a coil holder to hold the first and second three-phase stator coils 55 and 56.

In the present embodiment, in each of the teeth 76 of the stator core 54, that part of the first skew-forming portion 781 of the tooth 76 which protrudes from the radially-extending portion 77 of the tooth 76 toward the first circumferential side is chamfered on the radially outer side (i.e., the radial side furthest from the rotor 33). Consequently, between each circumferentially-adjacent pair of the first skew-forming portions 781 of the teeth 76, there is formed a relatively large magnetic gap G1.

Moreover, in each of the teeth 76 of the stator core 54, that part of the second skew-forming portion 782 of the tooth 76 which protrudes from the radially-extending portion 77 of the tooth 76 toward the second circumferential side is chamfered on the radially outer side the radial side furthest from the rotor 33). Consequently, between each circumferentially-adjacent pair of the second skew-forming portions 782 of the teeth 76, there is formed a relatively large magnetic gap G2.

In FIGS. 2 and 9, for the sake of simplicity, each of the first and second stator core segments 541 and 542 is depicted as a single piece. However, each of the first and second stator core segments 541 and 542 is actually constituted of a laminate that is formed by axially laminating a plurality of cold-rolled steel plates (e.g., SPCC according to JIS). Moreover, the steel plates forming the laminate are non-annealed steel plates whose Si equivalent weight is lower than or equal to 0.1% and which have a thickness greater than or equal to 0.35 mm. In addition, it should be noted that the laminate may alternatively be formed by axially laminating a plurality of magnetic steel plates.

As shown in FIG. 8, in each of the teeth 76 of the stator core 54, the first and second skew-forming portions 781 and 782 of the tooth 76 are formed symmetrically with respect to the first imaginary plane C1 that circumferentially bisects the radially-extending portion 77 of the tooth 76. In other words, the first and second skew-forming portions 781 and 782 are mirror images of each other. Therefore, the steel plates forming the first stator core segment 541 have the same shape and size as the steel plates forming the second stator core segment 542. That is, both the first and second stator core segments 541 and 542 are formed of the same type of steel plates.

As shown in FIG. 9, in each of the teeth 76 of the stator core 54, the distal end surface 81 of the first skew-forming portion 781 of the tooth 76 and the distal end surface 82 of the second skew-forming portion 782 of the tooth 76 are offset from the first imaginary plane C1, which circumferentially bisects the radially-extending portion 77 of the tooth 76, by the same offset angle (i.e., skew angle θs) but respectively toward opposite circumferential sides. Moreover, the ratio of axial length between the distal end surface 81 of the first skew-forming portion 781 and the distal end surface 82 of the second skew-forming portion 782 is equal to (50:50). That is, the ratio of lamination thickness between the first and second stator core segments 541 and 542 is equal to (50:50).

Moreover, when viewed from the radially inside, the first and second skew-forming portions 781 and 782 are point-symmetric with respect to the intersection point between the first imaginary plane C1 and a second imaginary plane C2; the second imaginary plane C2 axially bisects (i.e., bisects in the axial direction of the stator core 54) the distal end portion 78 of the tooth 76 which is comprised of the first and second skew-forming portions 781 and 782.

Referring back to FIG. 2, in the present embodiment, the axial length of the rotor 33 is set to be greater than the axial length of the stator core 54, i.e., greater than the sum of axial lengths of the distal end surfaces 81 and 82 of the first and second skew-forming portions 781 and 782 of each stator tooth 76; both the distal end surfaces 81 and 82 of the first and second skew-forming portions 781 and 782 face the rotor 33.

Figure 11:
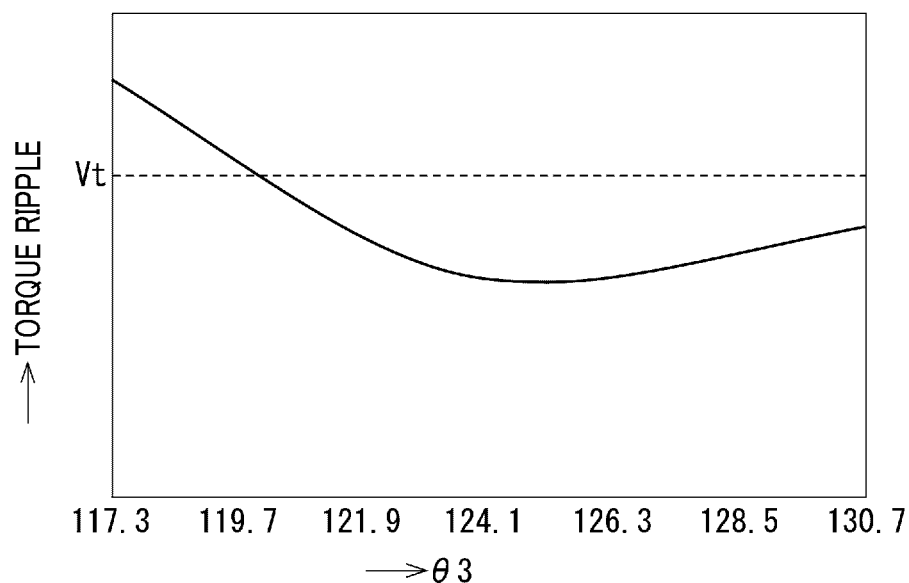
FIG. 11 is a graph illustrating the relationship between the angular range θ3 of each d-axis portion of a rotor and torque ripple in the electric motor according to the first embodiment.
Figure 12:
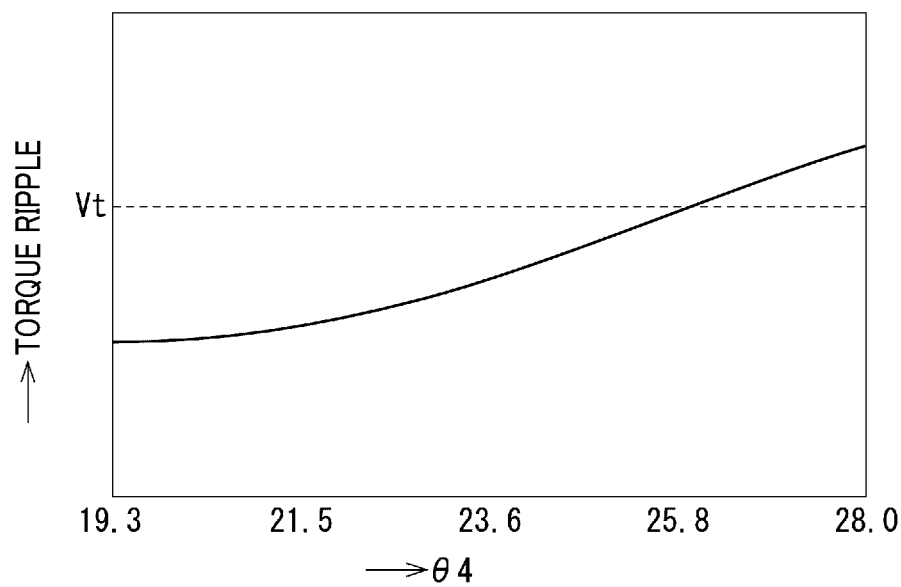
FIG. 12 is a graph illustrating the relationship between the angular range θ4 of each q-axis portion of a rotor and torque ripple in the electric motor according to the first embodiment.

Referring now to FIG. 6, in the present embodiment, the angular range $\theta 3$ of each d-axis portion of the rotor 33 is set so that $1.20° \leq \theta 3 \leq 130°$. Moreover, the angular range $\theta 4$ of each q-axis portion of the rotor 33 is set so that $19° \leq \theta 4 \geq 25°$. Consequently, as shown in FIGS. 11 and 12, it becomes possible to suppress torque ripple generated in the electric motor 23 below a target value Vt.

Advantageous Effects

According to the present embodiment, it is possible to achieve the following advantageous effects.

In the electric motor 23 according to the present embodiment, there is provided the phase difference of $\theta 1$ in electrical angle between the first and second three-phase stator coils 55 and 56. Each of the teeth 76 of the stator core 54 has the radially-extending portion 77 that radially extends from the back yoke 75 and the distal end portion 78 formed on the rotor 33 side of the radially-extending portion 77. The distal end portion 78 has the first and second skew-forming portions 781 and 782 arranged in the axial direction of the stator core 54. The first and second skew-forming portions 781 and 782 have the respective distal end surfaces 81 and 82 facing the rotor 33. The circumferential center positions P1 and P2 of the distal end surfaces 81 and 82 of the first and second skew-forming portions 781 and 782 are circumferentially offset from each other by $\theta 2$ in electrical angle. Moreover, the relationship of $\theta 2 < \theta 1$ is satisfied.

Consequently, with the phase difference of $\theta 1$ in electrical angle provided between the first and second three-phase stator coils 55 and 56, the fundamental and triple-order harmonic components of pulsating magnetic force generated by the first three-phase stator coil 55 can be offset (or canceled) those of pulsating magnetic force generated by the second three-phase stator coil 56, thereby reducing torque ripple generated in the electric motor 23.

Moreover, with the circumferential center positions P1 and P2 of the distal end surfaces 81 and 82 of the first and second skew-forming portions 781 and 782 circumferentially offset from each other by $\theta 2$ in electrical angle and satisfying the relationship of $\theta 2 < \theta 1$, the double-order harmonic component of the pulsating magnetic force venerated by the first three-phase stator coil 55 can be offset by that of the pulsating magnetic force generated by the second three-phase stator coil 56, thereby further reducing the torque ripple generated in the electric motor 23.

As a result, it becomes possible to achieve a further reduction in the torque ripple in comparison with the case of reducing the torque ripple only by providing a phase difference between the first and second three-phase stator coils 55 and 56.

Figure 13:
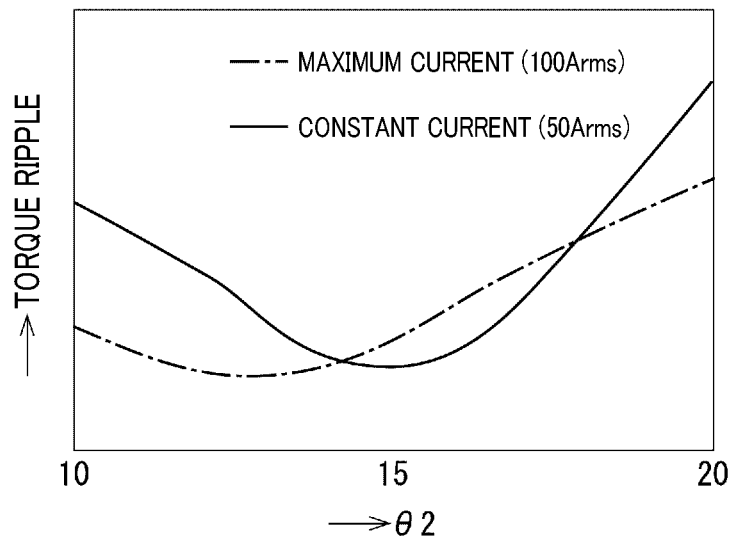
FIG. 13 is a graph illustrating the relationship between torque ripple and the offset angle θ2 between distal end surfaces of the first and second skew-forming portions of each stator core tooth in the electric motor according to the first embodiment.

FIG. 13 shows the relationship between the torque ripple and the offset angle $\theta 2$ with the phase difference of $\theta 1$ set to 30° in electrical angle. Specifically, in FIG. 13, the continuous-line curve represents the change in the torque ripple with the change in the offset angle $\theta 2$ in the range of 10 to 20° when the electric motor 23 operates at a constant current of 50 Arms; the chain-line curve represents the change in the torque ripple with the change in the offset angle $\theta 2$ in the range of 10 to 20° when the electric motor 23 operates at a maximum current of 100 Arms. In addition, the constant current of 50 Arms and the maximum current of 100 Arms are commonly seen in the design specifications of EPS motors electric motors employed in electric power steering apparatuses).

As can be seen from FIG. 13, at the constant current of 50 Arms, the torque ripple is reduced to the minimum value when the offset angle $\theta 2$ is half the phase difference of $\theta 1$ (i.e., equal to 15° in electrical angle).

Moreover, the maximum reduction in the torque ripple is achieved with the phase difference of $\theta 1$ set to 30° in electrical angle.

However, it should be noted that the torque ripple can be reduced by satisfying the relationship of $\theta 2 < \theta 1$ and setting $\theta 1$ to be in the range of 0 to 60° in electrical angle.

In the electric motor 23 according to the present embodiment, $h \geq 0.6W1$, and $W2 \geq W1$, where h is the radial height of the first and second skew-forming portions 781 and 782, is the minimum circumferential width of the radially-extending portion 77 at the radially inner end (or the distal end portion 78-side end) thereof, and W2 is the circumferential width of the distal end surfaces 81 and 82 of the first and second skew-forming portions 781 and 782.

Satisfying the above relationships, when phase currents supplied respectively to the phase windings 551-553 and 561-563 of the first and second three-phase stator coils 55 and 56 are increased, it is still possible to allow magnetic flux, which has flowed from the first radially-extending portion 771 to the first skew-forming portion 781, to alter its flow direction to the first circumferential side as shown with two-dot chain lines in FIG. 10, without causing magnetic saturation to occur in the first skew-forming portion 781. Moreover, though not shown in the figures, it is still possible to allow magnetic flux, which has flowed from the second radially-extending portion 772 to the second skew-forming portion 782, to alter its flow direction to the second circumferential side, without causing magnetic saturation to occur in the second skew-forming portion 782.

Figure 14:
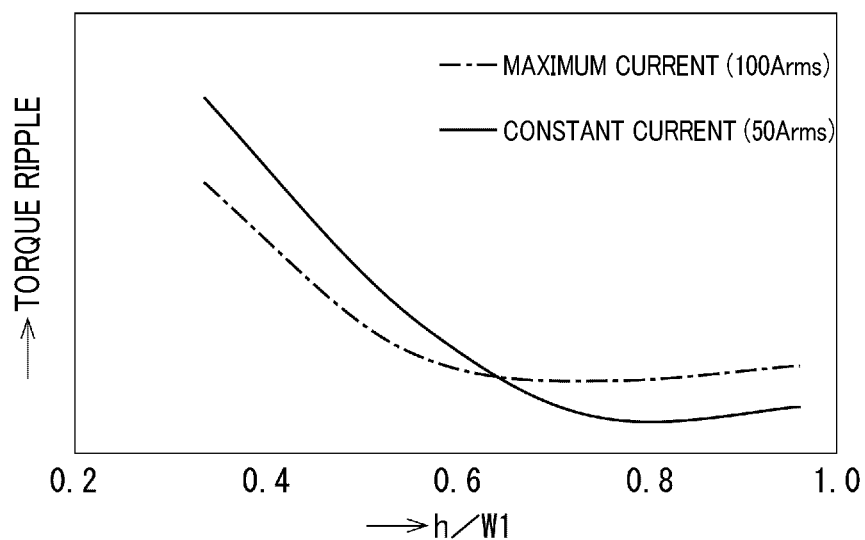
FIG. 14 is a graph illustrating the relationship between a parameter h/w1 and torque ripple in the electric motor according to the first embodiment.

FIG. 14 shows the relationship between the torque ripple and the ratio h/w1. Specifically, in FIG. 14, the continuous-line curve represents the change in the torque ripple with the change in the ratio h/w1 in the range of 0.2 to 1.0 when the electric motor 23 operates at the constant current of 50 Arms; the chain-line curve represents the change in the torque ripple with the change in the ratio h/w1 in the range of 0.2 to 1.0 when the electric motor 23 operates at the maximum current of 100 Arms.

As can be seen from FIG. 14, even at the maximum current of 100 Arms, the torque ripple can be reduced when the ratio h/w1 is higher than or equal to 0.6.

Figure 19:
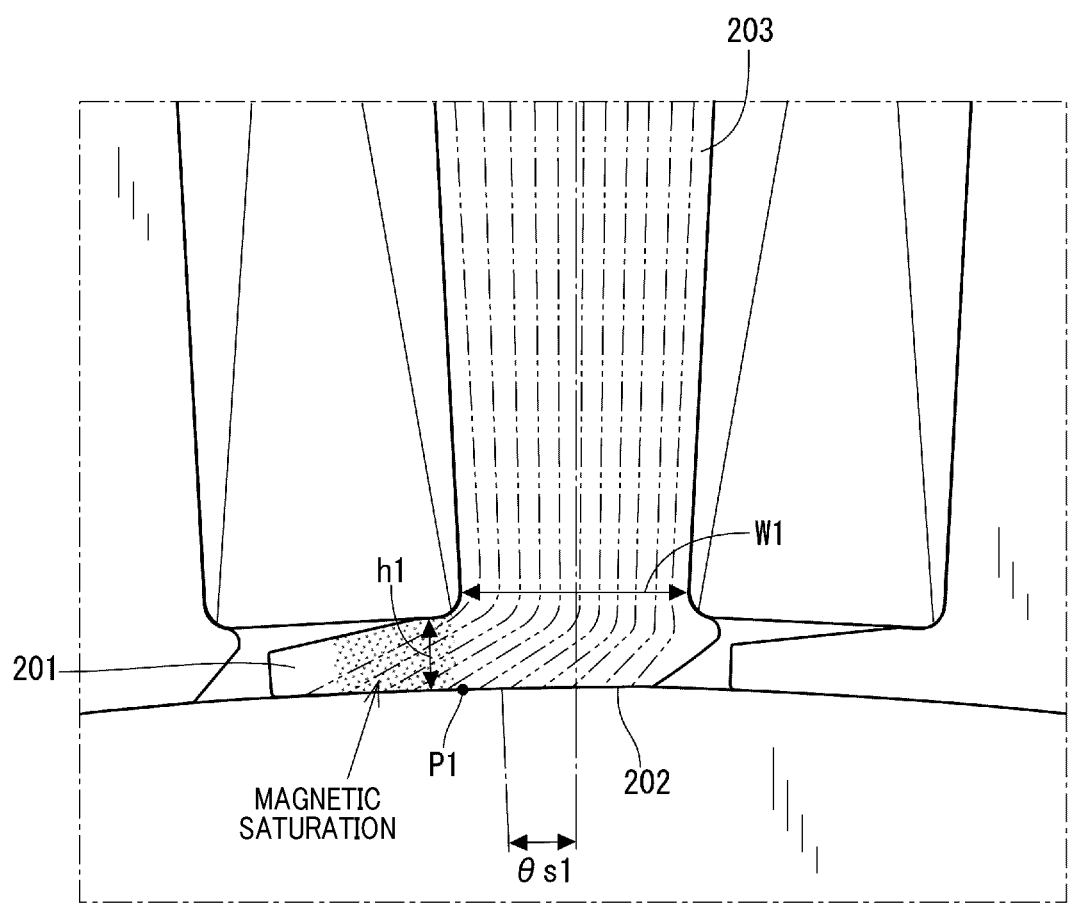
FIG. 19 is a schematic view illustrating the configuration of skew-forming portions of stator core teeth of an electric motor according to a comparative example.

In contrast, in a comparative example shown in FIG. 19, the radial height h1 of a first skew-forming portion 201 is relatively small and thus the ratio h1/W1 is less than 0.6. The circumferential center position P1 of a distal end surface 202 of the first skew-forming portion 201 is offset toward a first circumferential side (i.e., the left side in FIG. 19) from an imaginary plane that circumferentially bisects a first radially-extending portion 203. In this comparative example, the magnetic path becomes narrow in that part of the first skew-forming portion 201 which protrudes from the first radially-extending portion 203 toward the first circumferential side, causing magnetic flux to occur therein. Consequently, as shown with two-dot chain lines in FIG. 19, it becomes difficult for magnetic flux, which has flowed from the first radially-extending portion 203 to the first skew-forming portion 201, to alter its flow direction to the first circumferential side. As a result, the substantial skew angle θs1 undesirably becomes smaller than the skew angle θs in the electric motor 23 according to the present embodiment.

In the electric motor 23 according to the present embodiment, the entire distal end surface 81 of the first skew-forming portion 781 is located on the first circumferential side of the side surface 83 of the radially-extending portion 77 which is on the second circumferential side. Moreover, the first skew-forming portion 781 has the first protrusion 84 that is formed at the radially-extending portion 77-side end of the first skew-forming portion 781 to protrude from the radially-extending portion 77 toward the second circumferential side. On the other hand, the entire distal end surface 82 of the second skew-forming portion 782 is located on the second circumferential side of the side surface 85 of the radially-extending portion 77 which is on the first circumferential side. Moreover, the second skew-forming portion 782 has the second protrusion 86 that is formed at the radially-extending portion 77-side end of the second skew-forming portion 782 to protrude from the radially-extending portion 77 toward the first circumferential side.

With the above configuration, it is possible to easily assemble the first and second three-phase stator coils 55 and 56 into the slots 79 of the stator core 54. Moreover, it is also possible to reliably prevent the first and second three-phase stator coils 55 and 56 received in the slots 79 of the stator core 54 from being displaced radially inward and thus from making contact with the rotor 33.

In the electric motor 23 according to the present embodiment, in each of the teeth 76 of the stator core 54, that part of the first skew-forming portion 781 of the tooth 76 which protrudes from the radially-extending portion 77 of the tooth 76 toward the first circumferential side is chamfered on the radially outer side (i.e., the radial side furthest from the rotor 33). Moreover, that part of the second skew-forming portion 782 of the tooth 76 which protrudes from the radially-extending portion 77 of the tooth 76 toward the second circumferential side is chamfered on the radially outer side.

With the above configuration, between each circumferentially-adjacent pair of the first skew-forming portions 781 of the teeth 76, there is formed the relatively large magnetic gap G1; between each circumferentially-adjacent pair of the second skew-forming portions 782 of the teeth 76, there is formed the relatively large magnetic gap G2. Consequently, with the relatively large magnetic gaps G1 and G2, it is possible to suppress leakage of magnetic flux in the circumferential direction of the stator core 54.

In the electric motor 23 according to the present embodiment, the rotor 33 is configured as an IPM rotor. Moreover, the stator core 54 is formed of cold-rolled steel plates.

In general, EPS motors employ either an IPM rotor or an SPM (Surface Permanent Magnet) rotor. Moreover, it is desired to reduce both torque loss and torque ripple in EPS motors. In terms of reducing torque loss, IPM rotors are superior to SPM rotors. On the other hand, in terms of reducing torque ripple, SPM rotors are superior to IPM rotors. This is because IPM rotors generate reluctance torque as well as magnet torque.

More specifically, in IPM rotors, it is more difficult than in SPM rotors to reduce the induced voltage distortion the deviation of the induced voltage waveform from an ideal sine waveform) which causes torque ripple to occur. Therefore, it is easier for torque ripple to become high in IPM rotors than in SPM rotors. On the other hand, in SPM rotors, all the generated torque is magnet torque. Therefore, it is easier for torque loss, which is due to magnetic force, to become high in SPM rotors than in IPM rotors. Hence, to reduce torque loss, it is necessary to form the stator core with magnetic steel plates whose iron loss is low. However, magnetic steel plates are relatively expensive. Therefore, forming the stator core with magnetic steel plates, the manufacturing cost would be increased.

In contrast, in the electric motor 23 according to the present embodiment, the rotor 33 is configured as an IPM rotor; therefore, it is possible to effectively reduce torque loss. Moreover, as described above, the fundamental, double-order and triple-order harmonic components of the pulsating magnetic force generated by the first three-phase stator coil 55 can be offset by those of the pulsating magnetic force generated by the second three-phase stator coil 56; therefore, it is also possible to effectively reduce torque ripple. Consequently, though the stator core 54 is formed of cold-rolled steel plates (e.g., SPCC according to JIS), it is still possible to effectively reduce both torque loss and torque ripple. Moreover, forming the stator core 54 with the cold-rolled steel plates, it is also possible to reduce the manufacturing cost.

In addition, as described above, IPM rotors generate both magnet torque and reluctance torque; therefore, the quantity of magnets used in IPM rotors is less than that used in SPM rotors. Therefore, configuring the rotor 33 as an IPM rotor, it is possible to further reduce the manufacturing cost.

In the electric motor 23 according to the present embodiment, the distal end surface 81 of the first skew-forming portion 781 and the distal end surface 82 of the second skew-forming portion 782 are offset from the first imaginary plane C1, which circumferentially bisects the radially-extending portion 77, by the same offset angle but respectively toward the first and second circumferential sides (i.e., opposite circumferential sides). Moreover, the ratio of axial length between the distal end surface 81 of the first skew-forming portion 781 and the distal end surface 82 of the second skew-forming portion 782 is equal to (50:50).

With the above configuration, it is possible to cause the double-order harmonic component of the pulsating magnetic force generated by the first three-phase stator coil 55 and the double-order harmonic component of the pulsating magnetic force generated by the second three-phase stator coil 56 to be maximally offset by each other.

In the electric motor 23 according to the present embodiment, the distal end surfaces 81 and 82 of the first and second skew-forming portion 781 and 782 are arranged so that when viewed from the radially inside, the distal end surfaces 81 and 82 are point-symmetric with respect to the intersection point between the first imaginary plane C1 and the second imaginary plane C2 (see FIG. 9).

With the above arrangement, it is possible to realize the aforementioned configuration where the distal end surfaces 81 and 82 of the first and second skew-forming portion 781 and 782 are offset from the first imaginary plane C1 by the same offset angle but respectively toward the first and second circumferential sides and the ratio of axial length between the distal end surfaces 81 and 82 is equal to (50:50).

In the electric motor 23 according to the present embodiment, the axial length of the rotor 33 is set to be greater than the sum of axial lengths of the distal end surfaces 81 and 82 of the first and second skew-forming portions 781 and 782; both the distal end surfaces 81 and 82 face the rotor 33.

With the above configuration, even if the rotor 33 and the stator 32 are axially displaced relative to each other during the assembly or operation of the electric motor 23, it is still possible to maintain the skew formation ratio, thereby preventing the torque ripple-reducing capability of the electric motor 23 from being lowered.

Second Embodiment

Figure 15:
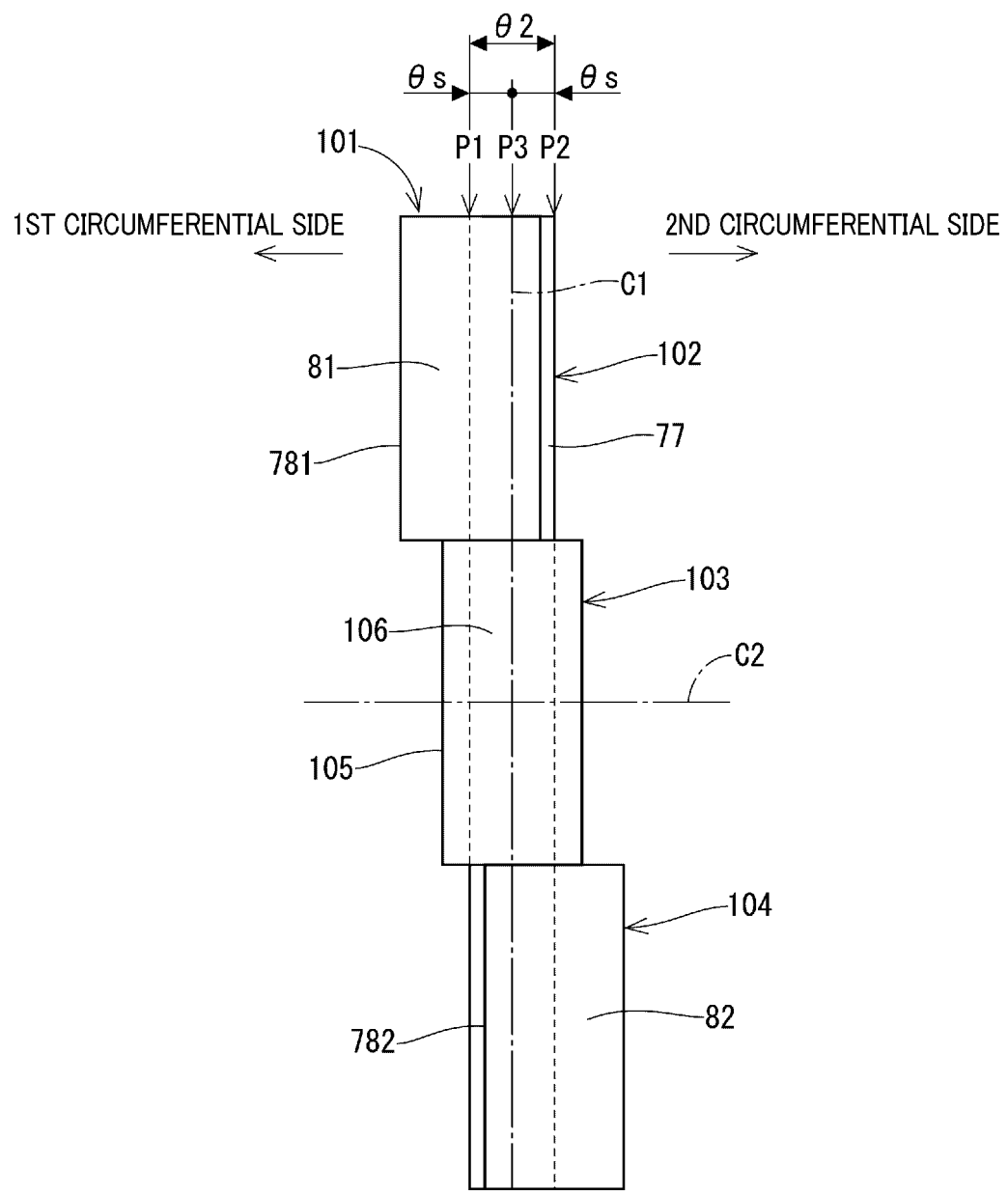
FIG. 15 is a schematic view, along a radially outward direction, of one of stator core teeth of an electric motor according to a second embodiment.

In the second embodiment, as shown in FIG. 15, a stator core 101 is comprised of three stator core segments 102, 103 and 104 that are assembled to each other in this order in an axial direction of the stator core 101. The stator core segment 102 is identical to the first stator core segment 541 described in the first embodiment except for the lamination thickness axial length). The stator core segment 104 is identical to the second stator core segment 542 described in the first embodiment except for the lamination thickness.

The intermediate stator core segment 103 has intermediate skew-forming portions 105 of the teeth 76 interposed between the first skew-forming portions 781 of the teeth 76 and the second skew-forming portions 782 of the teeth 76.

In each of the teeth 76, the intermediate skew-forming portion 105 of the tooth 76 has an intermediate phase between the phases of the first and second skew-forming portions 781 and 782 of the tooth 76. More specifically, the circumferential center position P3 of a distal end surface 106 of the intermediate skew-forming portion 105 is equidistant from the circumferential center position P1 of the distal end surface 81 of the first skew-forming portion 781 and the circumferential center position P2 of the distal end surface 82 of the second skew-forming portion 782. That is, the circumferential center position P3 falls on the first imaginary plane C1 that circumferentially bisects the radially-extending portion 77 of the tooth 76. The first skew-forming portion 781, the second skew-forming portion 782 and the intermediate skew-forming portion 105 together form a three-stage skew.

With the three-stage skew, it is also possible to achieve the same torque ripple reduction as described in the first embodiment. Moreover, it is also possible to set the ratio of axial length between the distal end surface 81 of the first skew-forming portion 781 and the distal end surface 82 of the second skew-forming portion 782 to (50:50) as in the first embodiment. Furthermore, it is also possible to arrange the distal end surfaces 81 and 82 of the first and second skew-forming portions 781 and 782 so that when viewed from the radially inside, the distal end surfaces 81 and 82 are point-symmetric with respect to the intersection point between the first imaginary plane C1 and the second imaginary plane C2.

Third Embodiment

Figure 16:
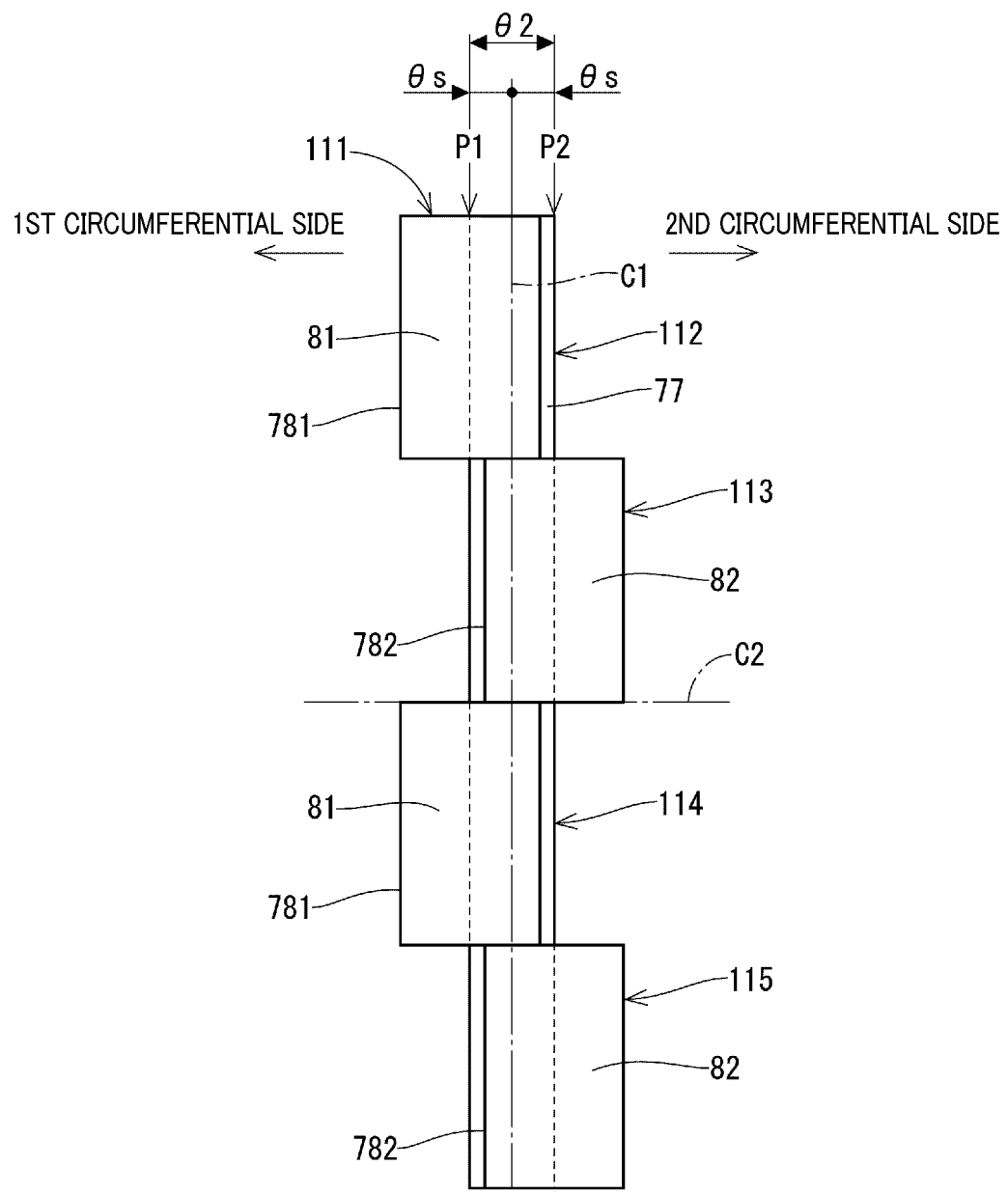
FIG. 16 is a schematic view, along a radially outward direction, of one of stator core teeth of an electric motor according to a third embodiment.

In the third embodiment, as shown in FIG. 16, a stator core 111 is comprised of four stator core segments 112, 113, 114 and 115 that are assembled to each other in this order in an axial direction of the stator core 111. Both the stator core segments 112 and 114 are identical to the first stator core segment 541 described in the first embodiment except for the lamination thickness (or axial length). Both the stator core segments 113 and 115 are identical to the second stator core segment 542 described in the first embodiment except for the lamination thickness. The stator core segments 112, 113, 114 and 115 together form a four-stage skew.

With the four-stage skew, it is also possible to achieve the same torque ripple reduction as described in the first embodiment. Moreover, it is also possible to set the ratio of axial length between the distal end surfaces 81 of the first skew-forming portions 781 formed in the stator core segments 112 and 114 and the distal end surfaces 82 of the second skew-forming portions 782 formed in the stator core segments 113 and 115 to (50:50).

Fourth Embodiment

Figure 17:
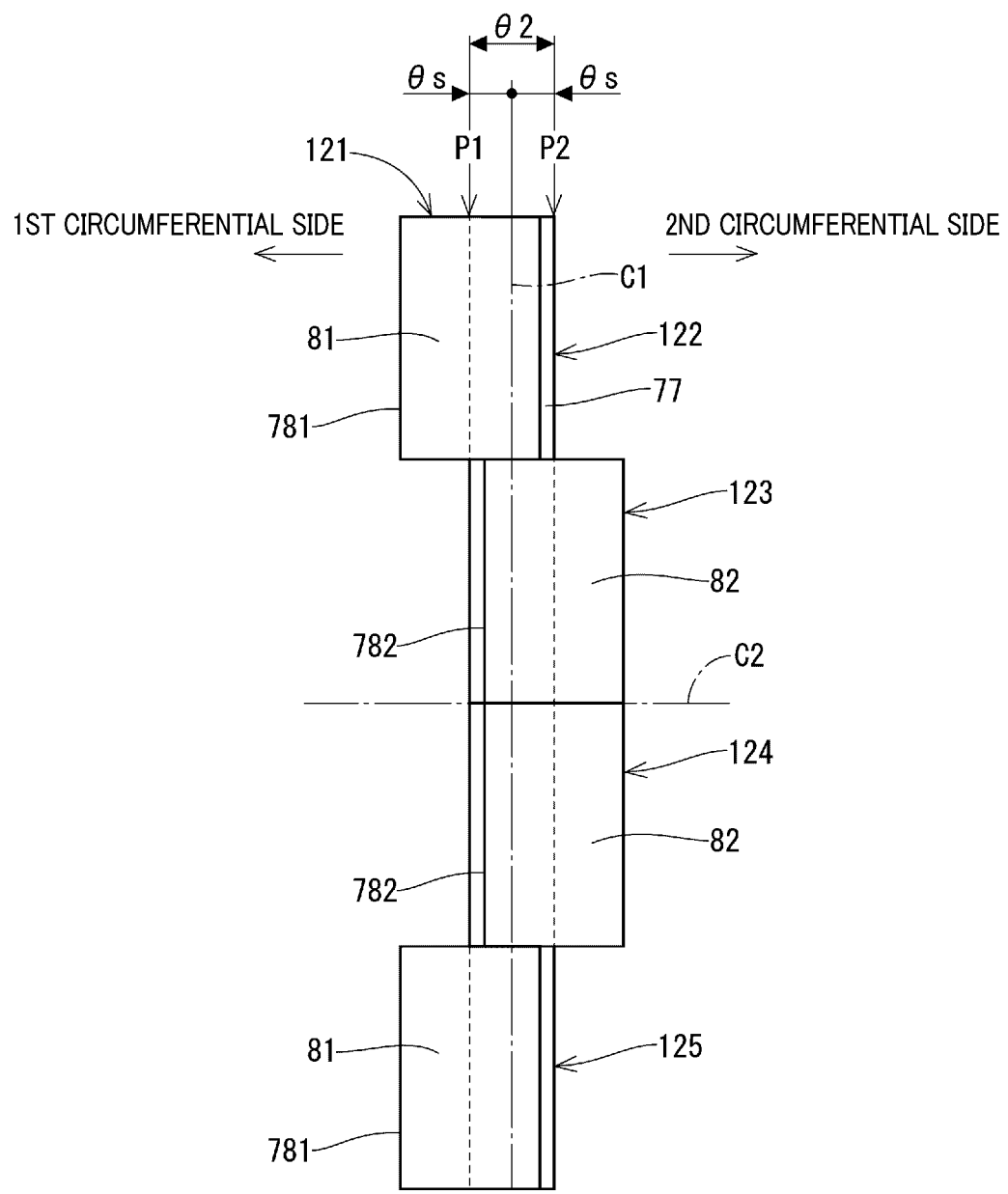
FIG. 17 is a schematic view, along a radially outward direction, of one of stator core teeth of an electric motor according to a fourth embodiment.

In the fourth embodiment, as shown in FIG. 17, a stator core 121 is comprised of four stator core segments 122, 123, 124 and 125 that are assembled to each other in this order in an axial direction of the stator core 121. Both the stator core segments 122 and 125 are identical to the first stator core segment 541 described in the first embodiment except for the lamination thickness (or axial length). Both the stator core segments 123 and 124 are identical to the second stator core segment 542 described in the first embodiment except for the lamination thickness. The stator core segments 122, 123, 124 and 125 together form a four-stage skew.

With the four-stage skew, it is also possible to achieve the same torque ripple reduction as described in the first embodiment. Moreover, it is also possible to set the ratio of axial length between the distal end surfaces 81 of the first skew-forming portions 781 formed in the stator core segments 122 and 125 and the distal end surfaces 82 of the second skew-forming portions 782 formed in the stator core segments 123 and 124 to (50:50).

Furthermore, in the present embodiment, the distal end surfaces 81 and 82 of the first and second skew-forming portions 781 and 782 formed in the stator core segments 122-125 are arranged so that when viewed from the radially inside, the distal end surfaces 81 and 82 are line-symmetric with respect to the second imaginary plane C2. With this arrangement, even if the rotor 33 and the stator 32 are axially displaced relative to each other during the assembly or operation of the electric motor 23, it is still possible to maintain the skew formation ratio, thereby preventing the torque ripple-reducing capability of the electric motor 23 from being lowered.

Fifth Embodiment

Figure 18:
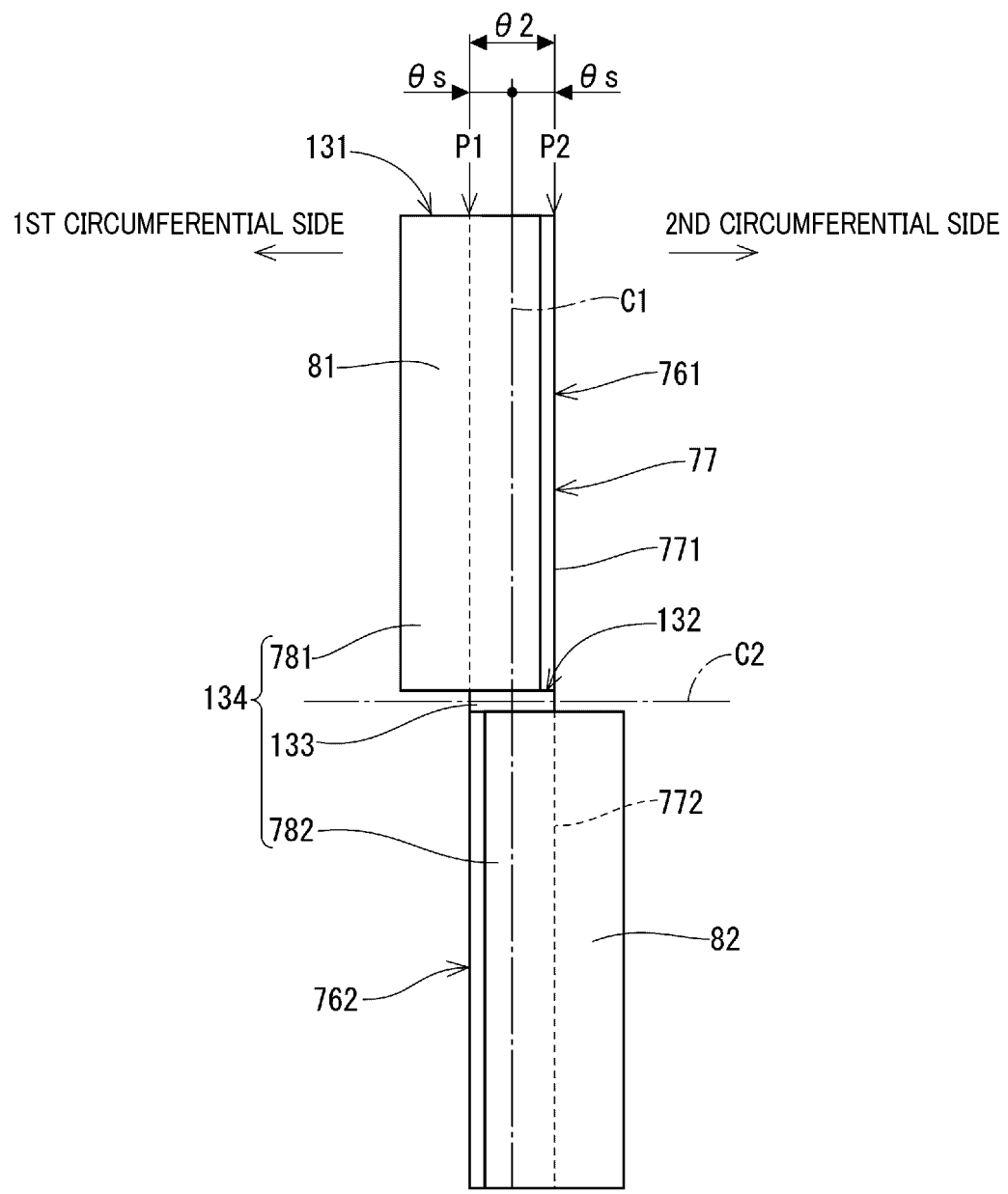
FIG. 18 is a schematic view, along a radially outward direction, of one of stator core teeth of an electric motor according to a fifth embodiment.

In the fifth embodiment, as shown in FIG. 18, a stator core 131 is comprised of a first stator core segment 541, a second stator core segment 542 and an intermediate stator core segment 132 interposed between the first and second stator core segments 541 and 542. The first and second stator core segments 541 and 542 are respectively identical to those described in the first embodiment. The intermediate stator core segment 132 has one nonmagnetic portion 133 for each of the teeth 76 of the stator core 131.

Specifically, in each of the teeth 76, a distal end portion 134 of the tooth 76 is comprised of the first skew-forming portion 781 formed in the first stator core segment 541, the nonmagnetic portion 133 formed in the intermediate stator core segment 132 and the second skew-forming portion 782 formed in the second stator core segment 542. The nonmagnetic portion 133 is interposed between the first skew-forming portion 781 and the second skew-forming portion 782.

In addition, in the present embodiment, the entire intermediate stator core segment 132 is formed of a nonmagnetic material such as a nonmetal material (e.g., resin) or a nonmagnetic metal (e.g., aluminum).

With the nonmagnetic portion 133 interposed between the first and second skew-forming portions 781 and 782, it is possible to suppress leakage of magnetic flux between the first and second skew-forming portions 781 and 782, thereby further reducing the torque ripple generated in the electric motor 23.

While the above particular embodiments have been shown and described, it will be understood by those skilled in the art that various modifications, changes, and improvements may be made without departing from the spirit of the present invention.

For example, in the above-described embodiments, each of the stator core segments is formed by axially laminating the steel plates. However, each of the stator core segments may alternatively be formed by helically winding a strip of core sheet, which has a plurality of teeth and a plurality of slots formed on one lateral side, while laminating the helically-wound strip.

In the above-described embodiments, the rotor 33 is configured as an IPM rotor. However, the rotor 33 may alternatively be configured as an SPM rotor.

In the above-described embodiments, the present invention is directed to the electric motor 23 employed in the electric power steering apparatus 20. However, the present invention can also be applied to electric motors for other uses.

Furthermore, the present invention can also be applied to rotating electric machines other than electric motors, such as an electric generator or a motor-generator that selectively functions either as an electric motor or as an electric generator.

What is claimed is:

1. A rotating electric machine comprising:
    a stator core having an annular back yoke, a plurality of teeth and a plurality of slots, the teeth each radially protruding from the back yoke and being circumferentially spaced from one another, each of the slots being formed between one circumferentially-adjacent pair of the teeth;
    a plurality of multi-phase stator coils each of which is comprised of a plurality of phase windings received in the slots of the stator core; and
    a rotor provided to rotate relative to the stator core, the rotor radially facing the teeth of the stator core,
    wherein
    between the plurality of multi-phase stator coils, there is provided, at a maximum, a phase difference of $\theta 1$ in electrical angle,
    each of the teeth of the stator core has a radially-extending portion that radially extends from the back yoke and a distal end portion formed on a rotor side of the radially-extending portion,
    the distal end portion has a plurality of skew-forming portions arranged in an axial direction of the stator core,
    each of the plurality of skew-forming portions has a distal end surface facing the rotor,
    circumferential center positions of the distal end surfaces of the plurality of skew-forming portions are circumferentially offset from one another by, at a maximum, $\theta 2$ in electrical angle, and $\theta 2 < \theta 1$, $h \geq 0.6 W1$, and $W2 > W1$, where h is a radial height of the plurality of skew-forming portions, W1 is a minimum circumferential width of the radially-extending portion at a distal end portion-side end thereof, and W2 is a circumferential width of the distal end surfaces of the plurality of skew-forming portions.

2. The rotating electric machine as set forth in claim 1, wherein the plurality of skew-forming portions comprise a first skew-forming portion and a second skew-forming portion,
    an entire distal end surface of the first skew-forming portion is located on a first circumferential side of one side surface of the radially-extending portion which is on a second circumferential side, the second circumferential side being opposite to the first circumferential side,
    the first skew-forming portion has a first protrusion that is formed at a radially-extending portion-side end of the first skew-forming portion to protrude from the radially-extending portion toward the second circumferential side,
    an entire distal end surface of the second skew-forming portion is located on the second circumferential side of another side surface of the radially-extending portion which is on the first circumferential side, and
    the second skew-forming portion has a second protrusion that is formed at a radially-extending portion-side end of the second skew-forming portion to protrude from the radially-extending portion toward the first circumferential side.

3. The rotating electric machine as set forth in claim 2, wherein that part of the first skew-forming portion which protrudes from the radially-extending portion toward the first circumferential side is chamfered on the radial side furthest from the rotor, and
    that part of the second skew-forming portion which protrudes from the radially-extending portion toward the second circumferential side is chamfered on the radial side furthest from the rotor.

4. The rotating electric machine as set forth in claim 1, wherein the plurality of skew-forming portions are formed of a magnetic material, and
    between each adjacent pair of the plurality of skew-forming portions, there is provided one nonmagnetic portion.

5. The rotating electric machine as set forth in claim 1, wherein the rotor is an interior permanent magnet rotor, and
    of the stator core, at least the plurality of skew-forming portions of the teeth are formed of steel plates whose Si equivalent weight is lower than or equal to 0.1%.

6. The rotating electric machine as set forth in claim 1, wherein the rotor is an interior permanent magnet rotor, and
    of the stator core, at least the plurality of skew-forming portions of the teeth are formed of steel plates whose thickness is greater than or equal to 0.35 mm.

7. The rotating electric machine as set forth in claim 1, wherein the rotor is an interior permanent magnet rotor, and of the stator core, at least the plurality of skew-forming portions of the teeth are formed of non-annealed steel plates.

8. The rotating electric machine as set forth in claim 1, wherein the plurality of skew-forming portions comprise a first skew-forming portion and a second skew-forming portion, the distal end surfaces of the first and second skew-forming portions are offset from an imaginary plane, which bisects the radially-extending portion in a circumferential direction of the stator core, by the same offset angle but respectively toward opposite circumferential sides, and a ratio of axial length between the distal end surfaces of the first and second skew-forming portions is equal to (50:50).

9. The rotating electric machine as set forth in claim 8, wherein when viewed along a radial direction of the stator core, the distal end surfaces of the first and second skew-forming portions are point-symmetrically arranged.

10. The rotating electric machine as set forth in claim 9, wherein an axial length of the rotor is set to be greater than a sum of axial lengths of the distal end surfaces of the first and second skew-forming portions.

11. The rotating electric machine as set forth in claim 1, wherein the distal end surfaces of the plurality of skew-forming portions are arranged so that when viewed along a radial direction of the stator core, the distal end surfaces are line-symmetric with respect to an imaginary plane that bisects the distal end portion in the axial direction of the stator core.

12. The rotating electric machine as set forth in claim 11, wherein an axial length of the rotor is set to be greater than a sum of axial lengths of the distal end surfaces of the plurality of skew-forming portions.

* * * * *